(12) United States Patent
Kaizuka

(10) Patent No.: US 10,183,521 B2
(45) Date of Patent: Jan. 22, 2019

(54) RESIN SHEET AND BOOKLET

(71) Applicant: TOPPAN PRINTING CO., LTD., Taito-ku, Tokyo (JP)

(72) Inventor: Tomoyoshi Kaizuka, Tokyo (JP)

(73) Assignee: Toppan Printing Co., Ltd., Taito-ku, Tokyo (JP)

( * ) Notice: Subject to any disclaimer, the term of this patent is extended or adjusted under 35 U.S.C. 154(b) by 0 days.

(21) Appl. No.: 15/403,030

(22) Filed: Jan. 10, 2017

(65) Prior Publication Data

US 2017/0144468 A1 May 25, 2017

(30) Foreign Application Priority Data

Jul. 15, 2014 (JP) .................. 2014-145141
Mar. 23, 2015 (JP) .................. 2015-059886

(51) Int. Cl.
*B42D 25/30* (2014.01)
*B23K 26/00* (2014.01)
(Continued)

(52) U.S. Cl.
CPC .............. *B42D 25/30* (2014.10); *B23K 26/00* (2013.01); *B23K 26/0006* (2013.01); *B23K 26/57* (2015.10); *B41M 5/26* (2013.01); *B42D 25/23* (2014.10); *B42D 25/24* (2014.10); *B42D 25/324* (2014.10); *B42D 25/328* (2014.10); *B42D 25/351* (2014.10); *B42D 25/41* (2014.10);
(Continued)

(58) Field of Classification Search
CPC ...... B42D 25/30; B42D 25/24; B42D 25/328; B42D 25/41; B23K 26/0006; B23K 26/0063; B23K 26/57; B23K 2203/42; G02B 3/0068; G02B 3/06; G02B 3/0043; G02D 3/005; B41M 5/26
USPC ................... 283/72, 74, 75, 94, 98, 901
See application file for complete search history.

(56) References Cited

U.S. PATENT DOCUMENTS 4,765,656 A 8/1988 Becker et al.
5,349,419 A 9/1994 Taguchi et al.
(Continued)

FOREIGN PATENT DOCUMENTS

EP 0 219 012 A2 4/1987
JP S 62-161596 A 7/1987
(Continued)

OTHER PUBLICATIONS

International Preliminary Report on Patentability dated Jan. 17, 2017 in International Patent Application No. PCT/JP2015/070311, 5 pages.
(Continued)

*Primary Examiner* — Justin V Lewis
(74) *Attorney, Agent, or Firm* — Squire Patton Boggs (US) LLP

(57) ABSTRACT

A resin sheet includes a plastic layer and at least one cylindrical lens. The resin layer has a first surface and a second surface that is the surface on the opposite side from the first surface. The cylindrical lens is formed on the first surface and extends along a first axis. The resin layer is provided with a print portion that is colored by exposure to a laser beam. The print portion includes a focal point of the cylindrical lens. The resin layer is configured allow a laser beam that enters the cylindrical lens to pass through to the print portion.

8 Claims, 14 Drawing Sheets

(51) Int. Cl.
*B41M 5/26* (2006.01)
*G02B 3/00* (2006.01)
*G02B 3/06* (2006.01)
*B42D 25/41* (2014.01)
*B42D 25/24* (2014.01)
*B23K 26/57* (2014.01)
*B42D 25/328* (2014.01)
*B42D 25/425* (2014.01)
*B42D 25/23* (2014.01)
*B42D 25/45* (2014.01)
*B42D 25/324* (2014.01)
*B42D 25/351* (2014.01)
*B23K 103/00* (2006.01)

(52) U.S. Cl.
CPC .......... *B42D 25/425* (2014.10); *B42D 25/45* (2014.10); *G02B 3/00* (2013.01); *G02B 3/005* (2013.01); *G02B 3/0043* (2013.01); *G02B 3/0068* (2013.01); *G02B 3/06* (2013.01); *B23K 2103/42* (2018.08)

(56) References Cited

U.S. PATENT DOCUMENTS

| | | |
|---|---|---|
| 5,995,132 A | 11/1999 | Tutt |
| 2005/0128885 A1 | 6/2005 | Huang et al. |
| 2007/0063053 A1 | 3/2007 | Bergmann et al. |
| 2008/0037131 A1 | 2/2008 | Steenblik et al. |
| 2008/0160226 A1 | 7/2008 | Kaule et al. |
| 2012/0319394 A1* | 12/2012 | Christen .............. G06K 19/025 283/63.1 |
| 2013/0154250 A1 | 6/2013 | Dunn et al. |
| 2014/0103632 A1* | 4/2014 | Camus .................. D21H 21/42 283/67 |

FOREIGN PATENT DOCUMENTS

| | | |
|---|---|---|
| JP | H04-234699 A | 8/1992 |
| JP | H05-289208 A | 11/1993 |
| JP | H11-239253 A | 8/1999 |
| JP | 2000-221620 A | 8/2000 |
| JP | 2005-182974 A | 7/2005 |
| JP | 3143782 U | 8/2008 |
| JP | 2010-14780 A | 1/2010 |
| JP | 2010-131878 A | 6/2010 |
| WO | WO 2006/087138 A1 | 8/2006 |
| WO | WO 2011/051669 A1 | 5/2011 |
| WO | WO 2012/008278 A1 | 6/2011 |

OTHER PUBLICATIONS

Extended European Search Report dated Feb. 1, 2018, in European Patent Application No. 15821965.9, 9 pages.
Notification of Reason for Refusal dated Dec. 20, 2017, in Korean Patent Application No. 10-2017-7003491, 9 pages.

* cited by examiner

RESIN SHEET AND BOOKLET

BACKGROUND

The present disclosure relates to a plastic sheet on which text or images are marked by laser marking and to a booklet including such plastic sheets as booklet pages.

Plastic sheets on which text or images are marked by projection of a laser beam have been proposed. Such a plastic sheet allows text or images to be marked at an inner part of the plastic sheet when the focal point of the laser beam is controlled to be at the inner part of the plastic sheet (for example, see International Publication No. 2012/008278).

To mark text or images at an inner part of the plastic sheet by projection of a laser beam, an amount of energy that changes the property of part of the material of the plastic sheet is necessary. For this reason, time is required for the energy of the laser beam projected onto the plastic sheet to reach a level that changes the property of part of the material in order to mark predetermined text or images on the plastic sheet.

SUMMARY

It is an objective of the present disclosure to provide a plastic sheet that reduces the time during which the laser beam is projected and to provide a booklet.

In accordance with one aspect of the present disclosure, a plastic sheet includes a plastic layer including a first surface and a second surface on an opposite side of the plastic layer from the first surface, and at least one cylindrical lens formed on the first surface and extending along a first axis. The plastic layer includes a print portion that is to be colored by exposure to a laser beam. The print portion includes a focal point of the cylindrical lens. The plastic layer is configured to allow a laser beam that enters the cylindrical lens to pass through to the print portion.

According to the above described aspect of the plastic sheet, the laser beam projected onto the print portion is caused to converge at the focal point located in the print portion by the cylindrical lens. Thus, compared with a case in which the laser beam is projected onto the print portion without passing through the cylindrical lens, the intensity of the laser beam projected onto the print portion is increased even with the same intensity of the laser beam at the source of the laser beam. For this reason, an amount of energy that changes the property of the material that forms the print portion is applied to the plastic layer in a shorter time. As a result, the time period during which the laser beam is projected onto the plastic sheet is reduced.

In accordance with another aspect of the above described plastic sheet, the plastic layer further preferably includes, in at least part of the plastic layer between the print portion and the second surface in the thickness direction of the plastic layer, a colored portion that has a color different from a color-changed portion that has been colored by exposure to the laser beam.

According to this aspect of the plastic sheet, since the colored portion that has a different color from the color-changed portion is located at a section closer to the second surface than the print portion, the color-changed portion is visually recognized more easily by the color difference between the color-changed portion formed in the print portion and the colored portion.

In accordance with another aspect of the above described plastic sheet, the at least one cylindrical lens on the first surface preferably includes a plurality of cylindrical lenses. The cylindrical lenses extend along the first axis, have widths equal to one another along the first axis, and are arranged side by side along a second axis that intersects the first axis.

According to this aspect of the plastic sheet, extrusion molding that extrudes resin along the first axis is applied as the method for manufacturing even the plastic sheet having multiple cylindrical lenses.

In accordance with another aspect of the above described plastic sheet, the cylindrical lenses are preferably first lenses, and the first lenses preferably have widths equal to one another along the second axis. The plastic sheet further includes second lenses that are cylindrical lenses, on the second surface. The second lenses extend along the first axis, are arranged side by side along the second axis, and have widths equal to one another along the second axis. The print portion is a first print portion. The plastic layer further includes a second print portion that is to be colored by exposure to a laser beam. The second print portion includes focal points of the second lenses. The plastic layer is configured to allow the laser beam that enters the second lenses to pass through to the second print portion. The width along the second axis of the first lenses differs from the width along the second axis of the second lenses.

In accordance with another aspect of the above described plastic sheet, the at least one cylindrical lens preferably includes a plurality of first lenses. The first lenses are located on the first surface. The plastic sheet further includes second lenses that are cylindrical lenses, on the second surface. The first lenses extend along the first axis, are arranged side by side along a second axis that intersects the first axis, and have widths equal to one another along the second axis. The second lenses extend along the first axis, are arranged side by side along the second axis, and have widths equal to one another along the second axis. The print portion is a first print portion. The plastic layer further includes a second print portion that is to be colored by exposure to a laser beam. The second print portion includes focal points of the second lenses. The plastic layer is configured to allow the laser beam that enters the second lenses to pass through to the second print portion. The width along the second axis of the first lenses differs from the width along the second axis of the second lenses.

According to this aspect of the plastic sheet, moiré effect is prevented from being caused by the first lens group formed on the first surface and the second lens group formed on the second surface. Thus, the first color-changed portion formed in the first print portion and the second color-changed portion formed in the second print portion are prevented from being difficult to be visually recognized due to moiré effect.

In accordance with another aspect of the above described plastic sheet, the at least one cylindrical lens on the first surface preferably includes a plurality of cylindrical lenses. The cylindrical lenses include the cylindrical lenses having different heights from one another.

According to this aspect of the plastic sheet, the color-changed portions are formed at sections where the positions in the thickness direction of the print portion are different from one another.

In accordance with another aspect of the above described plastic sheet, the plastic layer preferably includes, in the print portion, a color-changed portion that has been colored by exposure to the laser beam.

According to this aspect of the plastic sheet, since the color-changed portion is not exposed to the outside of the plastic layer, the color of the color-changed portion is prevented from changing, and part of the color-changed portion is prevented from being chipped with the passage of time.

In accordance with another aspect of the above described plastic sheet, the plastic layer is preferably made of a material that is the same as the material of the cylindrical lens. The plastic layer and the cylindrical lens are made of any material selected from a group consisting of a polycarbonate resin, a styrene acrylonitrile copolymer resin, and a cycloolefin polymer.

According to this aspect of the plastic sheet, a method for integrally molding the plastic layer and the cylindrical lenses is employed as the method for manufacturing the plastic sheet.

In accordance with another aspect of the above described plastic sheet, the material of the cylindrical lens is preferably a plastic. The cylindrical lens has a lens pitch P that is a width along a second axis that intersects the first axis. The cylindrical lens has a height that is a lens height H. The lens pitch P and the lens height H satisfy a relationship represented by $H/P \leq 0.7$.

The cylindrical lens made of plastic is generally formed by transferring the shape of a mold for forming the cylindrical lens onto the molten plastic. In this point, according to this aspect of the plastic sheet, since the aspect ratio, a value obtained by dividing the lens height H by the lens pitch P, is 0.7 or less, the shape of the mold is likely to be accurately transferred to the plastic.

In accordance with another aspect of the present disclosure, a booklet is provided that includes at least one booklet page formed of a plastic sheet and a fold where the booklet page is folded in a middle. The plastic sheet is the above described plastic sheet. The first axis is parallel to a direction in which the fold extends.

If the booklet is, for example, a booklet for personal identification such as a passport, the information on the booklet is read by a reader. At this time, the surface of the booklet page of the booklet contacts part of the reader, and friction occurs between the part of the reader and the surface of the booklet page. The position of the booklet page with respect to the reader generally changes along the direction parallel to the fold of the booklet or the direction perpendicular to the fold of the booklet.

In this point, according to the above aspect of the booklet, if the position of the booklet page with respect to the reader is changed along the direction perpendicular to the fold, the vertexes of the cylindrical lenses and parts of the booklet page other than the vertexes of the cylindrical lenses are alternately arranged in the moving direction of the booklet. That is, parts that contact the reader and parts that do not contact the reader are alternately arranged in the moving direction of the booklet. Thus, force applied to the booklet page by friction is spread compared with a configuration that changes the position of the booklet page with respect to the reader in a direction that is the same as the direction in which the cylindrical lenses extend. This increases the resistance of the booklet pages against friction.

In accordance with another aspect of the present disclosure, a booklet is provided that includes at least one booklet page formed of a plastic sheet and a fold where the booklet page is folded in a middle. The plastic sheet is the above described plastic sheet. The first axis intersects a direction in which the fold extends.

According to this aspect of the booklet, in a case in which the position of the booklet page with respect to the reader changes along the direction parallel to the folds of the booklet, the vertexes of the cylindrical lenses that contacts the reader and parts other than the vertexes that do not contact the reader are alternately arranged in the moving direction of the booklet. Thus, force applied to the booklet page by friction is spread compared with a configuration that changes the position of the booklet page with respect to the reader in a direction that is the same as the direction in which the cylindrical lenses extend. This increases the resistance of the booklet pages against friction.

DESCRIPTION OF EXEMPLARY EMBODIMENTS

First Embodiment

A plastic sheet and a booklet according to a first embodiment will be described with reference to FIGS. 1 to 9. Hereinafter, the configuration of the plastic sheet, a laser beam projection process, and the configuration of the booklet including plastic sheets as booklet pages will be described in this order.

[Configuration of Plastic Sheet]

The configuration of the plastic sheet will be described with reference to FIGS. 1 to 5.

Figure 1:
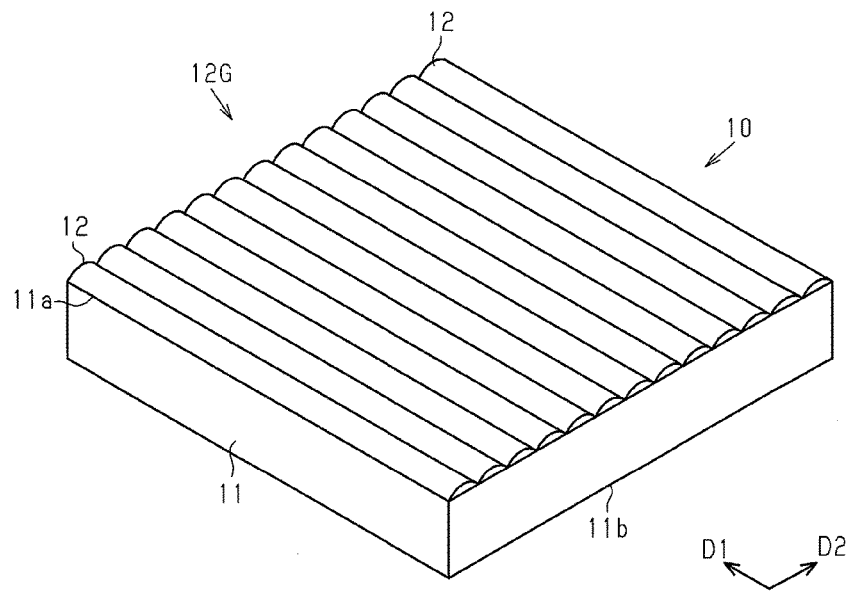
FIG. 1 is a perspective view of a plastic sheet according to a first embodiment showing the configuration of the plastic sheet.

As shown in FIG. 1, a plastic sheet 10 includes a plastic layer 11 and cylindrical lenses, which are first lenses 12 in this embodiment. The plastic sheet 10 may include multiple first lenses 12 or may include a single first lens 12. In the present embodiment, the plastic sheet 10 includes multiple first lenses 12. The first lenses 12 form a first lens group 12G.

The plastic layer 11 includes a first lens formation surface 11a and a rear surface 11b. The rear surface 11b is on the opposite side of the plastic layer 11 from the first lens formation surface 11a. The plastic layer 11 has a rectangular shape extending in, for example, one direction, which is a first axis D1 in this embodiment, and a direction orthogonal to the first axis D1, which is a second axis D2 in this embodiment. The plastic layer 11 includes a print portion that is to be colored by exposure to a laser beam. The print portion includes the focal points of the first lenses 12. The plastic layer 11 allows a laser beam that enters each first lens 12 to pass through to the print portion. The plastic layer 11 does not necessarily have to have a rectangular shape, but may have, for example, a circular shape. The first lens formation surface 11a is an example of a first surface, and the rear surface 11b is an example of a second surface.

Each of the first lenses 12 has a semicylindrical surface, which extends along the first axis D1, and extends along the first axis D1. The first lenses 12 are arranged side by side along the second axis D2. The first lenses 12, for example, do not have gaps between adjacent first lenses 12 in the direction of the second axis D2. However, there may be a gap between first lenses 12 that are adjacent to each other in the direction of the second axis D2.

The first lenses 12 have a width along the first axis D1 (the length) that is the same as the length along the first axis D1 of the plastic layer 11. The lengths along the first axis D1 of the first lenses 12 are the same as one another.

Figure 2:
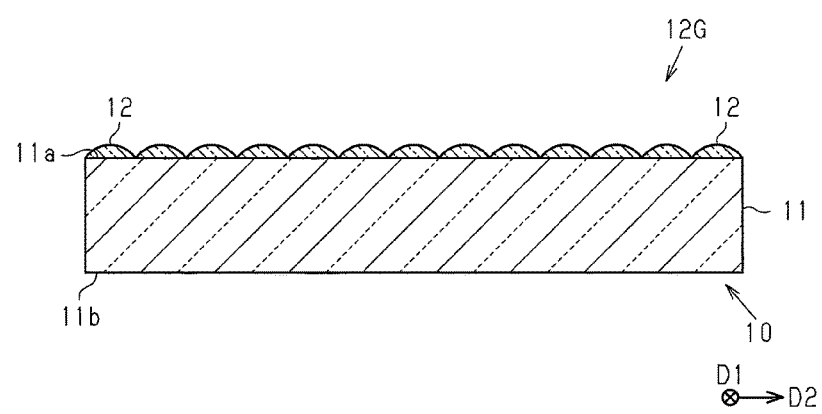
FIG. 2 is a cross-sectional view of the plastic sheet according to the first embodiment showing the configuration of the plastic sheet.

As shown in FIG. 2, the first lens formation surface 11a and the rear surface 11b of the plastic layer 11 are flat surfaces parallel to each other. The first lenses 12 are arranged side by side along the second axis D2 on the first lens formation surface 11a, which is the flat surface. That is, the first lenses 12 are located on the first lens formation surface 11a.

The plastic layer 11 is made of translucent material that allows a laser beam to pass through. The material of the plastic layer 11 may be, for example, a synthetic resin that allows a laser beam to pass through. The material of the plastic layer 11 may be, for example, a thermoplastic resin such as amorphous polyester, a poly methyl methacrylate (PMMA) resin, a polycarbonate (PC) resin, a polystyrene resin, polyester, a styrene acrylonitrile copolymer resin, and a cycloolefin polymer. The material of the plastic layer 11 does not necessarily have to be a thermoplastic resin, but may be an ultraviolet curable resin.

Furthermore, the material of the plastic layer 11 allows a color-changed portion to be formed by exposure to a laser beam. The color-changed portion is colored into a different color from the color before the laser beam is projected onto the plastic layer 11. Such a material of the plastic layer 11 includes, for example, a polycarbonate resin and polyester among the above-mentioned synthetic resins. A polycarbonate resin and polyester are preferable materials in that they have superior properties such as processability, thermal resistance, water resistance, and optical transparency in addition to colorability.

Changing the color of the plastic layer 11 includes projecting a laser beam onto the plastic layer 11 to heat the plastic layer 11 and thus generating foams at the inner part of the plastic layer 11, resulting in a state in which the section of the plastic layer 11 where the foam is formed is visually recognizable to have a different color from the color of other sections of the plastic layer 11. This configuration makes the section of the plastic layer 11 where the foam is formed to be visually recognizable to have a white color added to the color of the sections of the plastic layer 11 where the foam is not formed. The plastic layer 11 preferably has translucency that allows the laser beam to pass through and a predetermined color.

The material of the plastic layer 11 may include the above-mentioned synthetic resin and a pigment. If the material of the plastic layer 11 includes a pigment, changing the color of the plastic layer 11 includes projecting the laser beam onto the plastic layer 11 to increase the density of molecules of the pigment, that is, to condense the pigment compared with other parts of the plastic layer 11. This increases the density of the color at the section of the plastic layer 11 that is exposed to the laser beam compared with parts of the plastic layer 11 that are not exposed to the laser beam.

In a case in which the plastic layer 11 is carbonized to form the color-changed portion in the plastic layer 11, the material of the plastic layer 11 preferably includes a pigment that absorbs the laser beam more easily than the synthetic resin in addition to the above-mentioned synthetic resin.

In a case in which the material of the plastic layer 11 includes a pigment, any pigment may be employed in which the crystal structure of metal ions contained in the pigment is changed or the hydration amount contained in the crystal of metal ions is changed by exposure to the laser beam. With such a pigment, the color-changed portion is formed in the plastic layer 11 by chemical change of the pigment.

In other words, the plastic layer 11 is an example of the print portion on which predetermined text or predetermined images are marked by exposure to the laser beam.

The material of the first lenses 12 may be the same as or different from the material of the plastic layer 11. If the material of the first lenses 12 is the same as the material of the plastic layer 11 and is any of the above-mentioned thermoplastic resins, the plastic layer 11 is formed by, for example, melt molding such as extrusion molding and injection molding. For example, in a state in which the material of the plastic layer 11 is melted, a mold of the lenses having a predetermined lens shape is pressed against the material of the plastic layer 11 by, for example, heat embossing to form the first lenses 12. In this manner, the plastic layer 11 and the first lens group 12G are integrally formed.

If the plastic layer 11 and the first lens group 12G are integrally formed, the material of the plastic layer 11 and the first lens group 12G is preferably any one of a polycarbonate resin, a styrene acrylonitrile copolymer resin, and a cycloolefin polymer among the above-mentioned thermoplastic resins. These materials prevent the plastic layer 11 from generating hazardous gas when the laser beam is projected onto the plastic layer 11. If the material of the plastic layer 11 is, for example, polyvinyl chloride, toxic chlorine gas is generated from the plastic layer 11 upon exposure to the laser beam.

Furthermore, if the material of the plastic sheet 10 is any one of a polycarbonate resin, a styrene acrylonitrile copolymer resin, and a cycloolefin polymer, the strength of the plastic sheet 10 is increased compared with a sheet formed of other resins. In particular, if the material of the plastic sheet 10 is a polycarbonate resin, the plastic sheet 10 resists shearing and has reduced hygroscopicity.

If the material of the plastic sheet 10 is a polycarbonate resin, considering the thermal resistance of the polycarbonate resin, the plastic sheet 10 is preferably formed integrally by the above-mentioned method rather than having the plastic layer 11 and the first lens group 12G being separately formed and laminated with each other by heating.

If the material of the first lenses 12 and the material of the plastic layer 11 are the same and are the above-mentioned thermoplastic resin, the plastic layer 11 and the first lenses 12 may be formed by the following method. That is, in a state in which the material of the plastic layer 11 is hardened, the plastic that has been melted to form the first lenses 12 is applied to the first lens formation surface 11a of the plastic layer 11. The mold having a predetermined lens shape is pressed against the molten plastic to form the first lenses 12.

If the material of the first lenses 12 and the material of the plastic layer 11 differ from each other, for example, the material of the first lenses 12 is an ultraviolet curable resin, and the material of the plastic layer 11 is one of the above-mentioned thermoplastic resins. In this case, for example, after the plastic layer 11 is formed, the ultraviolet curable resin that has been melted is applied to the first lens formation surface 11a of the plastic layer 11. In a state in which the ultraviolet curable resin has a predetermined lens shape, ultraviolet rays are projected onto the ultraviolet curable resin, forming the first lenses 12.

If the plastic layer 11 and the first lenses 12 are separately formed, the first lens formation surface 11a of the plastic layer 11 may be subjected to a surface treatment, such as a corona treatment, to enhance adhesion between the first lens formation surface 11a of the plastic layer 11 and the first lenses 12.

Figure 3:
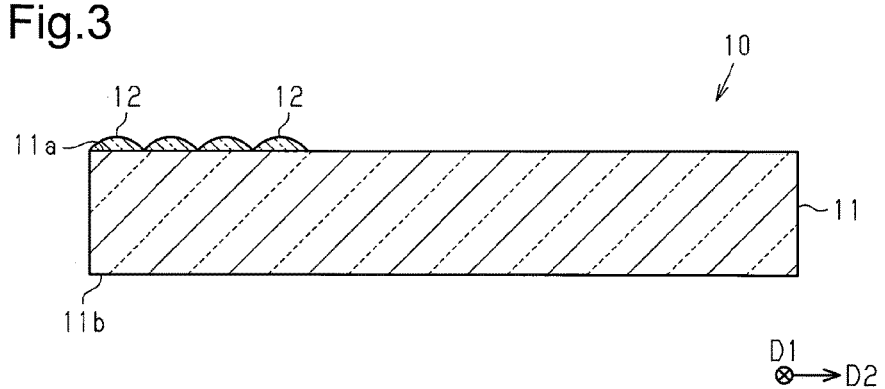
FIG. 3 is a cross-sectional view of the plastic sheet according to the first embodiment showing the configuration of the plastic sheet.
Figure 4:
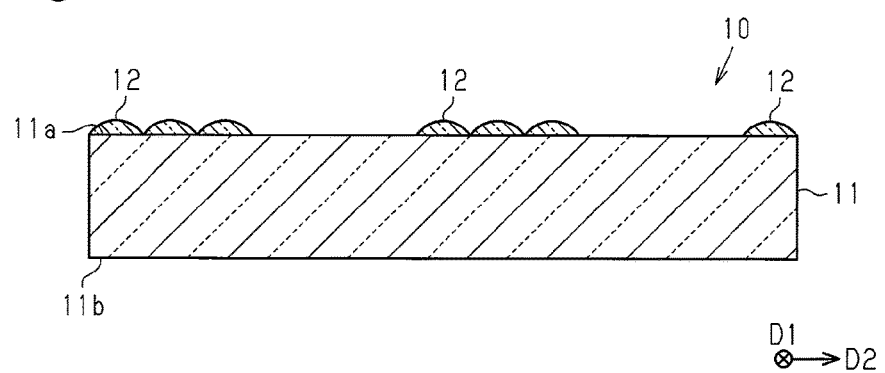
FIG. 4 is a cross-sectional view of the plastic sheet according to the first embodiment showing the configuration of the plastic sheet.

As shown in FIG. 3, the first lenses 12 may be located at a part of the first lens formation surface 11a in the direction of the second axis D2. Alternatively, as shown in FIG. 4, the first lenses 12 may be separated to multiple sections in the direction of the second axis D2.

As described above, sections on the first lens formation surface 11a of the plastic layer 11 where the first lenses 12 are located can be selected as required. For example, positions of the first lenses 12 on the first lens formation surface 11a of the plastic layer 11 may be determined depending on the sections where text or images are to be marked by projection of the laser beam onto the plastic layer 11.

Figure 5:
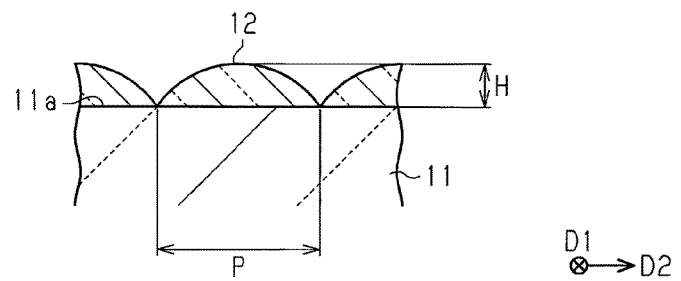
FIG. 5 is a partially enlarged cross-sectional view of the plastic sheet according to the first embodiment showing the configuration of part the plastic sheet.

As shown in FIG. 5, examples of parameters for determining the shape of the lens for the first lenses 12 include a lens pitch P, which is the width along the second axis D2 on the first lens formation surface 11a, and a lens height H, which is the maximum value of the distance from the first lens formation surface 11a. The lens pitch P and the lens height H are set to values such that the focal points of the first lenses 12 are located at sections where text or images are to be marked in the plastic layer 11.

The first lenses 12 have a lens aspect ratio A, which is the ratio of the lens height H to the lens pitch P. The lens aspect ratio A is represented by the following formula (2).

$$A=H/P \qquad \text{Formula (2)}$$

The lens height H is preferably included in the range between 5 μm and 50 μm, inclusive, and the lens pitch P is preferably included in the range between 10 μm and 100 μm, inclusive.

The lens aspect ratio A preferably satisfies the following formula (3).

$$A=H/P \leq 0.7 \qquad \text{Formula (3)}$$

If the lens height H of the first lenses 12 is 5 μm or more, the accuracy of the position of the focal points is prevented from being reduced due to interference of the laser beam projected onto the first lens 12. In a case in which the lens height H is 50 μm or less, the lens pitch P is prevented from being increased to a degree that causes the lenses to be visually recognizable even if the lens aspect ratio A is reduced. This prevents reduction in the visibility of the text or images marked in the plastic layer 11 due to the first lenses 12 formed on the plastic layer 11 being visually recognizable.

Furthermore, if the lens height H is 50 µm or less, the following advantage is obtained. That is, if other layers are formed on the first lenses 12 by, for example, application, transfer, or lamination, the entire first lenses 12 are easily covered with other layers, and grooves formed between the first lenses 12 adjacent to one another in the direction of the second axis D2 are easily filled.

If the lens aspect ratio A is 0.7 or less, the outer shape of the first lenses 12 is smooth to a degree that does not reduce the accuracy of transfer of the mold shape when the first lenses 12 are formed by melt molding. This increases the accuracy of the shape of the first lenses 12, thus increasing the accuracy of the positions of the focal points when the laser beam is projected onto the first lenses 12.

In general, the first lenses 12 have a greater focal distance with a configuration in which the lens aspect ratio A is relatively small than with a configuration in which the lens aspect ratio A is relatively great. Thus, if the lens aspect ratio A is 0.7 or less, text or images are marked at sections of the plastic layer 11 away from the first lens formation surface 11a. For this reason, text or images are unlikely to be exposed on the surface of the plastic layer 11 and have high durability against stress such as friction. Furthermore, since text or images are easily located at sections in the plastic layer 11 away from the first lens formation surface 11a, the plastic sheet 10 is hard to be forged compared with a configuration in which text or images are located on the surface of the plastic layer 11.

[Laser Beam Projection Process]

A laser beam projection process will be described with reference to FIGS. 6 to 8.

Figure 6:
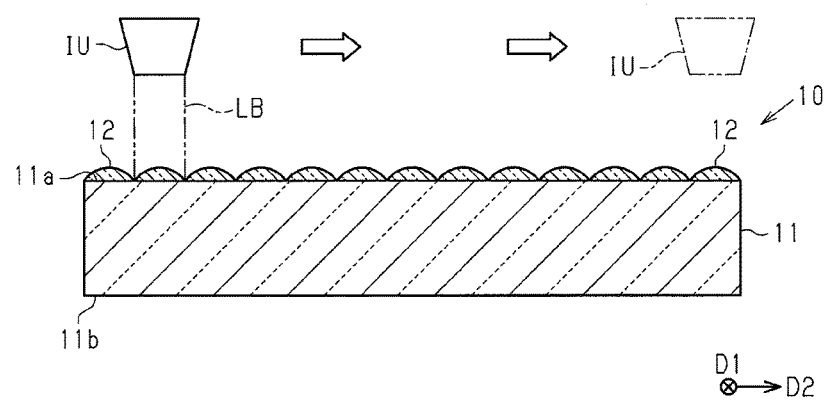
FIG. 6 is an explanatory diagram illustrating a process for projecting a laser beam onto the plastic sheet according to the first embodiment.

As shown in FIG. 6, when a laser beam LB is projected onto the plastic sheet 10, a projection unit IU, which projects the laser beam LB onto the plastic sheet 10, causes the laser of the projection unit IU to scan the plastic sheet 10 along the first axis D1 and the second axis D2. The projection unit IU includes at least the laser, which projects the laser beam LB onto the plastic sheet 10, and a position changing mechanism, which changes the position of the laser with respect to the plastic sheet 10.

After the projection unit IU causes the laser, which projects the laser beam LB, to scan the object along, for example, the first axis D1 in which one of the first lenses 12 extends, the projection unit IU shifts the position of the laser along the second axis D2 to the first lens 12 that is adjacent to the first lens 12 on which the laser beam LB has been projected.

In a plan view toward the first lens formation surface 11a, the projection unit IU causes the laser to scan the object along the first axis D1 in which the associated first lens 12 extends that is three-dimensionally overlapped with the laser. The laser may project the laser beam LB toward the associated first lens 12 while scanning the object along the first axis D1, or may project the laser beam LB toward the associated first lens 12 only during a predetermined time period while scanning the object along the first axis D1.

The laser of the projection unit IU may be, for example, any of the following lasers. That is, the lasers include, for example, a far-infrared radiation laser such as a $CO_2$ laser, a near-infrared pulsed laser such as a Nd:YAG laser and a Nd:YVO laser, a visible light pulsed laser, and an excimer laser. Alternatively, the laser includes an ultraviolet laser that uses the third harmonic of a Nd:YAG laser or a Nd:YVO laser, a semiconductor laser, a femtosecond laser, and a picosecond laser.

Among the above lasers, the Nd:YAG laser and the Nd:YVO laser are more preferable than other lasers in that they have high output and high pulse stability. The lasers that use the third harmonic of the Nd:YAG laser or the Nd:YVO laser are more preferable than other lasers in that they have high resolution and inhibit part of the plastic layer 11 around the portion exposed to the laser beam LB from being damaged by heat since the material of the plastic layer 11 absorbs ultraviolet rays.

An ultrashort pulsed laser such as a femtosecond laser and a picosecond laser is able to break molecular bonds configuring the plastic layer 11 without increasing the temperature around the portion exposed to the laser beam LB in the plastic sheet 10 compared with an infrared radiation laser. Thus, the ultrashort pulsed laser is capable of making text or images on the plastic layer 11 without heating, that is, while preventing the plastic layer 11 from being damaged by heat.

The Nd:YAG laser and the semiconductor laser are able to generate great heat energy with a small projection unit IU compared with other lasers. Thus, the Nd:YAG laser and the semiconductor laser are capable of making text or images on the plastic sheet 10 on demand.

Figure 7:
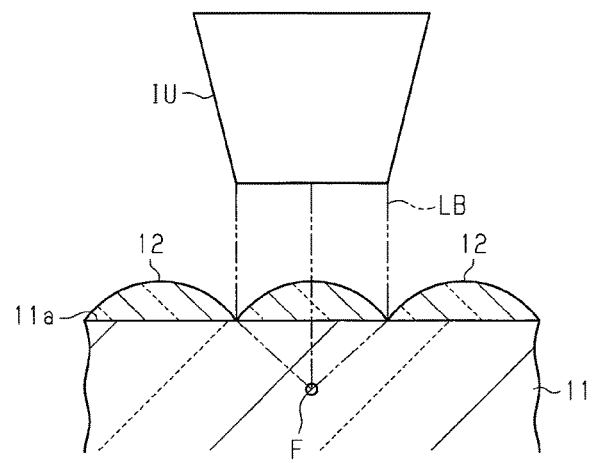
FIG. 7 is an explanatory diagram illustrating a process for projecting a laser beam onto the plastic sheet according to the first embodiment and is a partially enlarged view illustrating part of the projection unit and part of the plastic sheet.

As shown in FIG. 7, the laser beam LB projected toward the associated first lens 12 from the laser of the projection unit IU enters the cylindrical surface of the first lens 12. At this time, part of the laser beam LB projected toward the first lens 12 deflects at the interface between air and the first lens 12, and part of the laser beam LB goes straight through the interface between air and the first lens 12. Thus, the first lens 12 causes the laser beam LB to converge to a focal point F located in the plastic layer 11. When the sum of the light energy projected on the focal point F of the first lens 12 reaches an amount of energy greater than or equal to an amount of energy that changes the property of the material of the plastic layer 11, the color-changed portion is formed at the section of the focal point F in the plastic layer 11.

In this manner, the laser beam LB converges at a section located in the plastic layer 11 of the plastic sheet 10, that is, at the focal point F of the associated first lens 12. Thus, even if the energy of the laser beam LB set in the projection unit IU is the same, less time is required for the sum of the light energy projected on a predetermined section of the plastic layer 11 to reach the amount of energy that is greater than or equal to the amount of energy that changes the property of the material of the plastic layer 11 in the plastic sheet 10 compared with the configuration that does not include the cylindrical lenses.

Even if the amount of energy of the laser beam LB set in the projection unit IU is reduced, the time required for the sum of the light energy to reach the amount of energy that is greater than or equal to the amount of energy that changes the property of the material of the plastic layer 11 can be less than or equal to the time required in the configuration that does not include the cylindrical lenses.

For this reason, even in a case of marking text or images on demand as described above and in which the amount of information of text or images marked on the plastic sheet 10 is great, generation of heat in the projection unit IU is limited and the time required for the projection process using the projection unit IU is reduced.

As described above, the plastic sheet 10 increases the proportion of the energy that is used for forming the color-changed portions in the plastic layer 11 with respect to the energy of the laser beam LB projected onto the plastic sheet 10. This reduces the period of time during which the laser beam LB is projected onto parts of the plastic layer 11 other than the sections where the color-changed portions are to be formed. For this reason, part of the plastic layer 11 is prevented from being damaged by heat generated by being exposed to the laser beam LB. As a result, the color of the plastic layer 11 is prevented from being changed into a yellowish color, and gas is prevented from being emitted from the plastic layer 11 due to damage on the plastic layer 11. Since the color of the plastic layer 11 is prevented from being changed, the color-changed portions in the plastic sheet 10 are prevented from being less visible.

Since the first lenses 12 are located on the first lens formation surface 11a of the plastic layer 11, sections where color-changed portions are located in the thickness direction of the plastic layer 11 are controlled by the shape of the first lenses 12. Furthermore, the difference in the amount of exposure to the laser beam is increased between the sections exposed to the laser beam through the first lenses 12 and the sections that are not exposed to the laser beam in the plastic layer 11. This increases the fineness of the color-changed portions and increases the contrast between the sections of the plastic layer 11 where the color-changed portions are formed and the surrounding parts of the color-changed portions.

Figure 8:
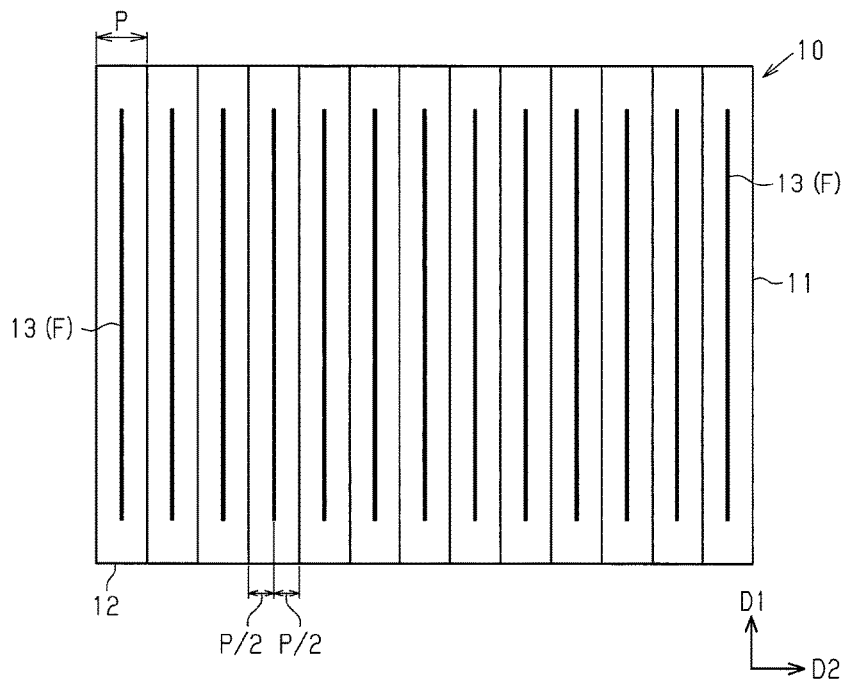
FIG. 8 is a plan view of the plastic sheet according to the first embodiment showing the configuration of the plastic sheet.

As shown in FIG. 8, the focal point F of each first lens 12 is located on a straight line extending along the first axis D1. Thus, when the laser beam LB is projected onto the plastic layer 11 along the first axis D1, which is the direction in which the first lenses 12 extend, a color-changed portion 13 is formed straight along the first axis D1.

The focal point F of each first lens 12 is located at the midpoint of the lens pitch P of the first lens 12 along the second axis D2. Thus, the color-changed portion 13 is formed at a position apart from each of the two edges of the associated first lens 12 in the direction of the second axis D2 by a distance of P/2.

[Configuration of Booklet]

Figures 9A, 9B:
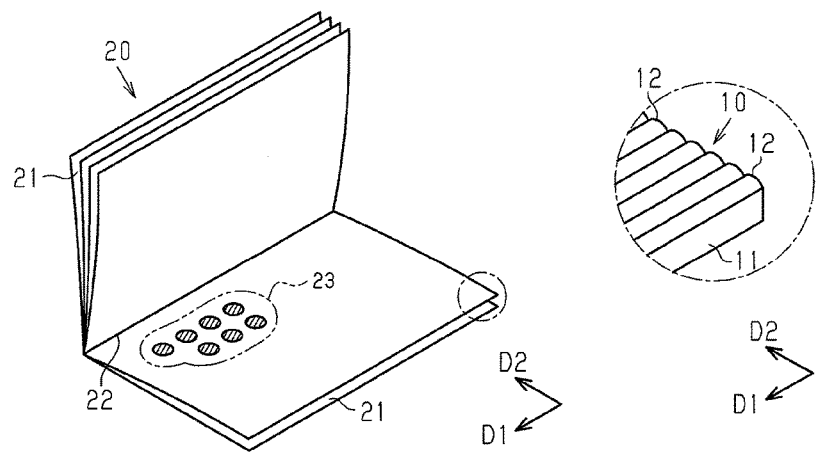
FIG. 9A is a perspective view of a booklet including plastic sheets according to the first embodiment as booklet pages showing the configuration of the booklet.
FIG. 9B is a partially enlarged perspective view of the booklet showing the configuration of the booklet.

The configuration of a booklet will be described with reference to FIG. 9. In FIG. 9, a general arrangement of the booklet is shown in FIG. 9A, and an enlarged view showing the configuration of part of a booklet page is shown in FIG. 9B.

As shown in FIG. 9A, a booklet 20 includes multiple booklet pages 21 and folds 22. The folds 22 are formed by folding the booklet pages 21. The booklet pages 21 are bundled at the folds 22 by at least one of, for example, a thread composed of fiber such as cotton and a metal wire. The booklet pages 21 are formed of the above-mentioned plastic sheets 10. However, the booklet pages 21 may include only at least one plastic sheet 10.

The folds 22 of the booklet 20 extend along, for example, the first axis D1. As shown in FIG. 9B, since the first lenses 12 extend along the first axis D1, the folds 22 extend in a direction parallel to the first lenses 12 of the booklet pages 21. Some of booklet pages 21 include information 23 including text or images formed of the color-changed portions 13. In each of the booklet pages 21 that includes the information 23, the information 23 is located at, for example, part of the booklet page 21.

If the booklet 20 is, for example, a booklet for personal identification such as a passport or a bankbook, the information 23 marked on the booklet pages 21 of the booklet 20 is read by a reader. At this time, the booklet 20 is inserted in the reader, causing friction between part of the reader and the surface of the booklet pages 21. When the reader obtains information 23 on the associated booklet page 21, the position of the booklet page 21 with respect to the reader is changed along, for example, the direction orthogonal to the folds 22 of the booklet 20.

Thus, if the position of the booklet page 21 with respect to the reader is changed along the direction perpendicular to the folds 22, the vertexes of the first lenses 12 and parts of the booklet page 21 other than the vertexes of the first lenses 12 are alternately arranged in the moving direction of the booklet 20. That is, parts that contact the reader and parts that do not contact the reader are alternately arranged in the moving direction of the booklet 20.

Thus, force applied to the booklet pages 21 by friction is likely to be spread compared with a configuration that changes the position of the booklet page 21 with respect to the reader in a direction that is the same as the direction in which the first lenses 12 extend. As a result, resistance of the booklet pages 21 against friction is increased.

Since each of the booklet pages 21 includes the first lenses 12 on the surface facing another booklet page 21, compared with the booklet pages that do not include cylindrical lenses, the area that contacts another booklet page 21 is reduced and the parts that contact the other booklet page 21 are not continuous in the direction of the second axis D2. Thus, for example, even if material that has adhesiveness under a predetermined temperature or more is applied to another booklet page 21 that faces the booklet page 21, the booklet page 21 and the other booklet page 21 are prevented from adhering each other when the booklet 20 is under the predetermined temperature or more.

As described above, the first embodiment has the following advantages.

(1) The laser beam projected onto the plastic layer 11 is caused to converge at the focal points located in the plastic layer 11 by the cylindrical lenses, which are the first lenses 12 in this embodiment. Thus, compared with a case in which the laser beam is projected onto the plastic layer 11 without passing through the cylindrical lenses, the intensity of the laser beam projected onto the plastic layer 11 is increased even with the same intensity of the laser beam at the source of the laser beam. For this reason, an amount of energy that changes the property of the material that forms the plastic layer 11 is applied to the plastic layer 11 in a shorter time. As a result, the time period during which the laser beam is projected onto the plastic sheet 10 is reduced.

(2) Since the first lenses 12 included in the first lens group 12G have the same width (or the length) along the first axis D1, extrusion molding that extrudes resin along the first axis D1 can be applied as the method for manufacturing the plastic sheet 10.

(3) Since the color-changed portions 13 are not exposed to the outside of the plastic layer 11, the color of the color-changed portions 13 is prevented from being changed and part of the color-changed portions 13 is prevented from being chipped with the passage of time.

(4) The material of the plastic layer 11 and the material of the first lenses 12 are the same as each other and may be any material selected from a group consisting of a polycarbonate resin, a styrene acrylonitrile copolymer resin, and a cycloolefin polymer. In this case, the material of the plastic layer 11 and the material of the first lenses 12 are the material preferable for integrally forming the plastic layer 11 and the first lenses 12.

(5) When the aspect ratio, which is a value obtained by dividing the lens height H by the lens pitch P, is 0.7 or less, the shape of the mold is likely to be accurately transferred to the resin.

(6) Sections that contact the reader and sections that do not contact the reader are alternately arranged in the moving direction of the booklet 20. Thus, force applied to the booklet pages 21 by friction is likely to be spread compared with a configuration that changes the position of the booklet pages 21 with respect to the reader in a direction that is the same as the direction in which the first lenses 12 extend. This increases the resistance of the booklet pages 21 against friction.

Modifications of First Embodiment

The first embodiment may be modified as follows.

In the process for projecting the laser beam LB onto the plastic sheet 10, the laser beam LB may be projected onto the plastic sheet 10 from diagonally above the first lens formation surface 11a.

In the process for projecting the laser beam LB onto the plastic sheet 10, the laser beam LB is projected onto the plastic sheet 10 from the front, which is a direction directly opposite the first lens formation surface 11a of the plastic sheet 10, as described in the above embodiment. In this case, the position of the focal point of the laser beam LB in the thickness direction of the plastic sheet 10 can be changed by changing the wavelength of the laser beam LB.

A case in which a laser beam LB having a first wavelength $\lambda 1$ and a laser beam LB having a second wavelength $\lambda 2$, which is shorter than the first wavelength $\lambda 1$, is projected onto the plastic sheet 10 will hereafter be described.

Figure 10:
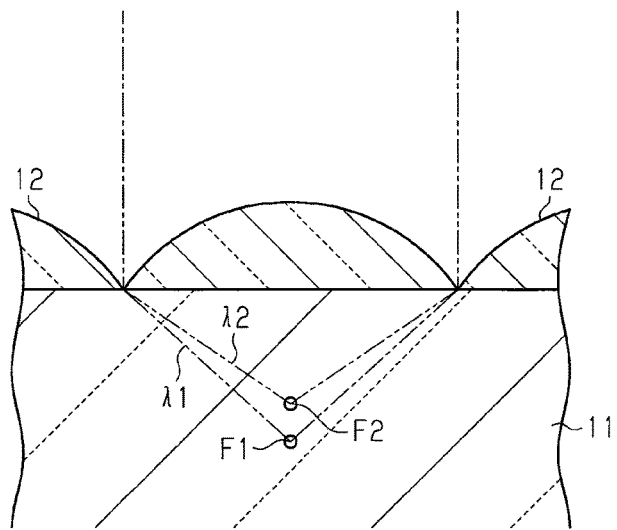
FIG. 10 is an explanatory diagram illustrating a process for projecting a laser beam according to a modification of the first embodiment and is a partially enlarged cross-sectional view of part of the plastic sheet.

As shown in FIG. 10, the focal point when the laser beam LB having the first wavelength $\lambda 1$ is projected onto the plastic sheet 10 is referred to as a long wavelength focal point F1, and the focal point when the laser beam LB having the second wavelength $\lambda 2$ is projected onto the plastic sheet 10 is referred to as a short wavelength focal point F2. In a region of the plastic layer 11 onto which one of the first lenses 12 is projected, the long wavelength focal point F1 and the short wavelength focal point F2 are formed at positions different from each other in the thickness direction of the plastic layer 11. That is, two focal points are formed the positions of which are substantially the same as viewed from the front of the first lens 12 and are different from each other in the thickness direction of the plastic layer 11.

Thus, two color-changed portions 13 that are located at substantially the same positions as viewed from the front of the first lens 12 and are located at different positions from each other in the thickness direction of the plastic layer 11 are formed in the plastic layer 11.

With this configuration, when the plastic sheet 10 is observed from the front, the two color-changed portions 13 are observed to be overlapped with each other. When the plastic sheet 10 is observed from diagonally above, the two color-changed portions 13 are separately observed. That is, the information such as text or images obtained when the plastic sheet 10 is observed from the front can be made different from the information obtained when the plastic sheet 10 is observed from diagonally above.

If the total luminous transmittance of the plastic layer 11 is 70% or more, the information formed of the multiple color-changed portions 13 are visually recognized from the direction facing the rear surface 11b in addition to the direction facing the first lens formation surface 11a. Moreover, the information visually recognized when observed from the direction facing the first lens formation surface 11a is visually recognized as different information from the information visually recognized when observed from the direction facing the rear surface 11b. Thus, depending on whether the information visually recognized from the direction facing the first lens formation surface 11a is different from the information visually recognized from the direction facing the rear surface 11b, the plastic sheet 10 can be determined to be genuine or not. That is, the plastic sheet 10 on which the information is formed functions as a structure for preventing the plastic sheet 10 itself from being forged, or a structure for preventing the booklet 20, which includes the plastic sheets 10, from being forged.

The direction in which the first lenses 12 extend may intersect with the direction in which the folds 22 of the booklet 20 extend. With this configuration, the following advantage is obtained.

(7) When the position of the booklet pages 21 with respect to the reader changes in the direction parallel to the folds 22 of the booklet 20, the vertexes of the first lenses 12 and sections of the booklet pages 21 other than the vertexes of the first lenses 12 are arranged alternately in the moving direction of the booklet 20. Thus, force applied to the booklet pages 21 by the friction is likely to be spread compared with a configuration that changes the position of the booklet pages 21 with respect to the reader in a direction that is the same as the direction in which the first lenses 12 extend. This increases the resistance of the booklet pages 21 against friction.

Figure 11:
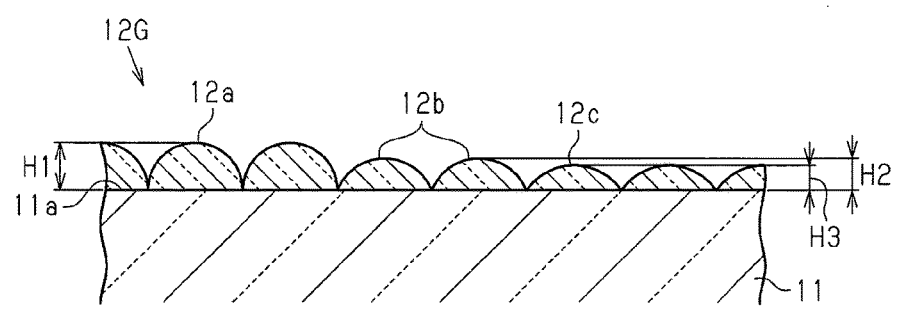
FIG. 11 is a partially enlarged cross-sectional view of the plastic sheet according to a modification of the first embodiment showing the configuration of a part the plastic sheet.

As shown in FIG. 11, the first lens group 12G may include the first lenses 12 having different lens heights H from one another. For example, the first lens group 12G includes largest lenses 12a, medium lenses 12b, and smallest lenses 12c. The largest lenses 12a have a first lens height H1. The medium lenses 12b have a second lens height H2. The smallest lenses 12c have a third lens height H3. The first lens height H1 is the greatest, and the third lens height H3 is the smallest among the three lens heights H.

That is, the three kinds of lenses have the same lens pitch P, and the lens heights decreases in the order of the largest lenses 12a, the medium lenses 12b, and the smallest lenses 12c. The curvature radius of the curved surface on the largest lenses 12a is the smallest, the curvature radius of the curved surface on the medium lenses 12b is the second smallest, and the curvature radius of the smallest lenses 12c is the greatest. The focal distance of the largest lenses 12a is the smallest, the focal distance of the medium lenses 12b is the second smallest, and the focal distance of the smallest lenses 12c is the greatest. With this configuration, the following advantage is obtained.

(8) The color-changed portions 13 are formed at different sections of the plastic layer 11 in the thickness direction.

The first lens group 12G may include the first lenses 12 that have different lens pitches P from one another.

Figure 12:
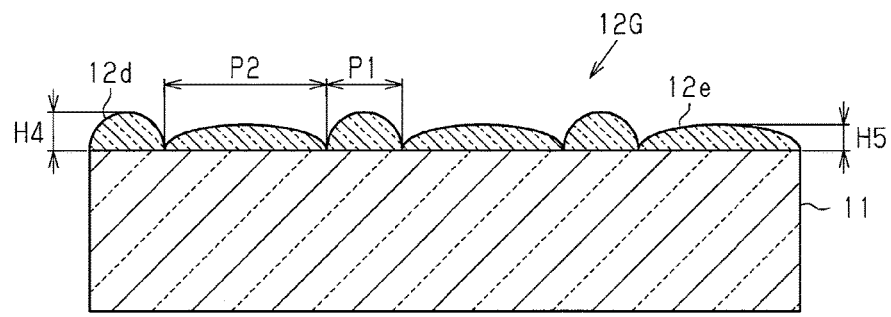
FIG. 12 is a cross-sectional view of the plastic sheet according to a modification of the first embodiment showing the configuration of the plastic sheet.

As shown in FIG. 12, the first lens group 12G may include first lenses having different lens heights H and different lens pitches P from one another. That is, the first lens group 12G may include narrow lenses 12d having a fourth lens height H4 and a first pitch P1, and wide lenses 12e having a fifth lens height H5 and a second pitch P2. The fourth lens height H4 is greater than the fifth lens height H5 and the first pitch P1 is smaller than the second pitch P2.

That is, since the curvature radius of the curved surface on the narrow lenses 12d is smaller than the curvature radius of the curved surface on the wide lenses 12e, the focal distance of the narrow lenses 12d is shorter than the focal distance of the wide lenses 12e on the assumption that the refractive index of the narrow lenses 12d is the same as the refractive index of the wide lenses 12e.

Figure 13:
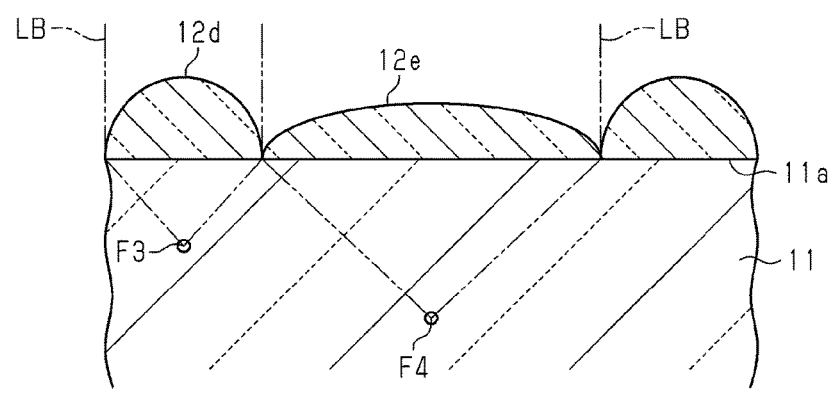
FIG. 13 is an explanatory diagram illustrating a process for projecting a laser beam onto the plastic sheet according to the modification of the first embodiment and is a partially enlarged cross-sectional view of the plastic sheet.

Thus, as shown in FIG. 13, when the laser beam LB is projected on the first lens formation surface 11a from the front, or an observation direction directly opposite the first lens formation surface 11a, the position of the focal point F3 of each narrow lens 12d differs from the position of the focal point F4 of each wide lens 12e in the thickness direction of the plastic layer 11. The distance from the first lens formation surface 11a to the focal point F3 of the narrow lens 12d is less than the distance from the first lens formation surface 11a to the focal point F4 of the wide lens 12e. As a result, the positions of the color-changed portions 13 formed by using the narrow lenses 12d differ from the positions of the color-changed portions 13 formed by using the wide lenses 12e in the thickness direction of the plastic layer 11.

The configuration in which the color-changed portions 13, which form the information, include the color-changed portions 13 that are located at different positions in the thickness direction of the plastic layer 11 gives three-dimensional visual effect to the information compared with a configuration in which all the color-changed portions 13 are located at the same positions in the thickness direction of the plastic layer 11.

If the total luminous transmittance of the plastic layer 11 is 70% or more, the information formed by the multiple color-changed portions 13 are visually recognizable from the direction facing the rear surface 11b in addition to the direction facing the first lens formation surface 11a. Furthermore, the information visually recognizable when observed from the direction facing the first lens formation surface 11a and the information visually recognizable when observed from the direction facing the rear surface 11b are visually recognizable as different pieces of information from each other. Thus, depending on whether the information visually recognizable from the direction facing the first lens formation surface 11a is different from the information visually recognizable from the direction facing the rear surface 11b, the plastic sheet 10 can be determined to be genuine or not. That is, the plastic sheet 10 on which the information is formed functions as a structure for preventing the plastic sheet 10 itself from being forged or a structure for preventing the booklet 20, which includes the plastic sheets 10, from being forged.

Figure 14:
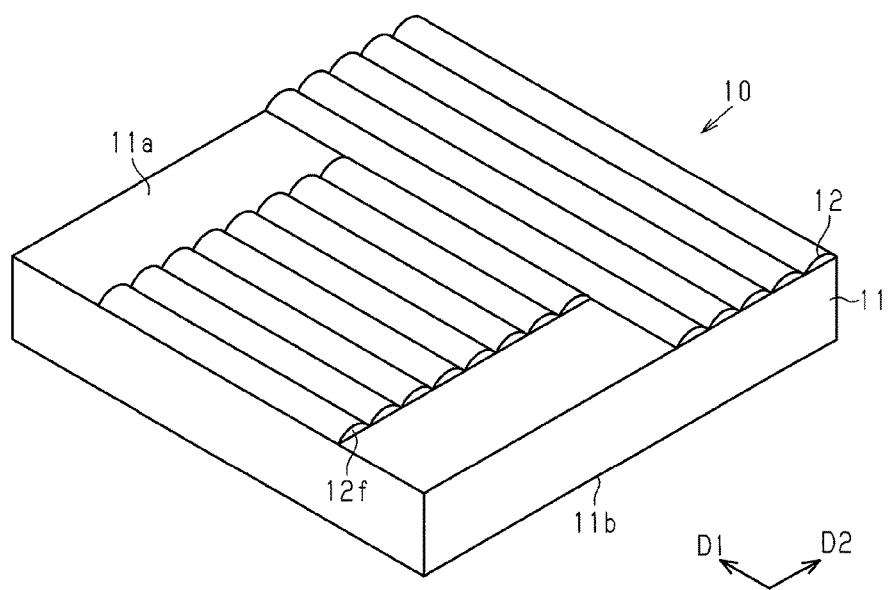
FIG. 14 is a perspective view of the plastic sheet according to a modification of the first embodiment showing the configuration of the plastic sheet.

As shown in FIG. 14, the width along the first axis D1 (the length) of the first lenses 12 may differ from the width along the first axis D1 (the length) of the plastic layer 11. That is, the first lens group 12G may include first lenses 12f located at part of the plastic layer 11 along the first axis D1. With this configuration also, an advantage equivalent to the above advantage (1) is obtained at part of the plastic sheet 10 where the first lenses 12, 12f are provided.

Figure 15A:
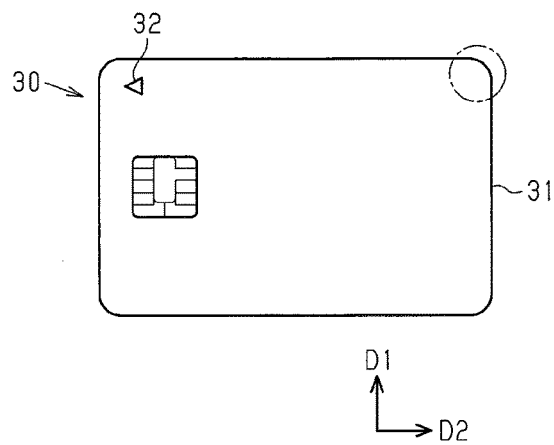
FIG. 15A is a plan view of a plastic card that uses the plastic sheet according to the first embodiment showing the configuration of the plastic card.
Figure 15B:
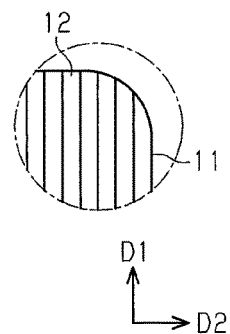
FIG. 15B is a partially enlarged plan view of the plastic card showing the configuration of part of the plastic card.

As shown in FIG. 15A, in addition to the booklet pages 21 of the booklet 20, the plastic sheet 10 may constitute a base material 31 of various cards 30 such as, for example, cash cards or credit cards. With this configuration also, if the direction in which the first lenses 12 extend in the base material 31 shown in FIG. 15B intersect a reading direction 32 of the card 30 shown in FIG. 15A, an advantage equivalent to the above advantage (6) is obtained.

The entire plastic layer 11 does not necessarily have to be the print portion on which the color-changed portions 13 can be formed by exposure to the laser beam. However, the plastic layer 11 may have any configuration as long as at least a section from the first lens formation surface 11a to the focal points of the first lenses 12 in the thickness direction of the plastic layer 11 is the print portion. With this configuration also, an advantage equivalent to the above advantage (1) is obtained.

At least a section including the focal points of the first lenses 12 in the thickness direction of the plastic layer 11 is the print portion, which is colored by exposure to the laser beam, and a section from the print portion to the first lens formation surface 11a is a light permeable portion having light permeability and may also be a section where the color-changed portion is hard to be formed compared with the print portion. With this configuration also, since the section including the focal points of the first lens formation surface 11a is the print portion, and the laser beam reaches the print portion through the light permeable portion, an advantage equivalent to the advantage (1) is obtained.

For example, the plastic layer 11 may have any configuration as long as the plastic layer 11 includes a print layer in which the color-changed portions 13 can be formed and a light permeable layer that covers the print layer, and the surface of the light permeable layer that is on the opposite side to the surface contacting the print layer is the first lens formation surface 11a.

As shown in FIGS. 3 and 4, if the first lens formation surface 11a of the plastic layer 11 has a section on which the first lenses 12 are not formed, the section of the first lens formation surface 11a on which the first lenses 12 are not formed may have, for example, a predetermined pattern formed by a heat stamp or a similar tool.

Second Embodiment

A plastic sheet and a booklet according to a second embodiment will be described with reference to FIGS. 16 and 17. The second embodiment differs from the first embodiment in that the plastic layer includes two lens formation surfaces. The differences will mainly be discussed below, and the same reference numerals are given to those components of the second embodiment that are the same as the corresponding components of the first embodiment and detailed explanations for the same components are omitted.

[Configuration of Plastic Sheet]

The configuration of the plastic sheet will be described with reference to FIGS. 16 and 17.

Figure 16:
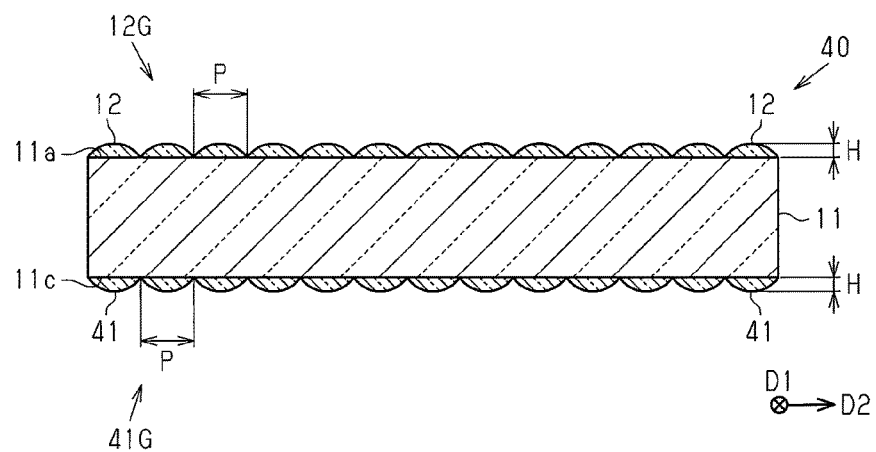
FIG. 16 is a cross-sectional view of a plastic sheet according to a second embodiment showing the configuration of the plastic sheet.

As shown in FIG. 16, a plastic sheet 40 includes the plastic layer 11 and the first lens group 12G, which includes multiple first lenses 12 located on the first lens formation surface 11a of the plastic layer 11. The surface of the plastic layer 11 on the opposite side to the first lens formation surface 11a is a second lens formation surface 11c. The second lens formation surface 11c may include one second lens 41 or multiple second lenses 41. In the present embodiment, the plastic sheet 40 includes multiple second lenses 41, and the second lenses 41 configure a second lens group 41G. Like the first lenses 12, the second lenses 41 are cylindrical lenses. The first lens formation surface 11a is an example of the first surface, and the second lens formation surface 11c is an example of the second surface.

Like the first lenses 12, each of the second lenses 41 includes a semicylindrical surface extending along the first axis D1 and extends along the first axis D1. The second lenses 41 are arranged side by side along the second axis D2. The adjacent second lenses 41 do not have gaps between one another along the second axis D2, but gaps may be formed between the adjacent second lenses 41 along the second axis D2.

The width along the first axis D1 (the length) of the second lenses 41 is equal to the length along the first axis D1 of the plastic layer 11, and the lengths along the first axis D1 of the second lenses 41 are the same as one another.

The lens pitch P of the second lenses 41 is equal to, for example, the lens pitch P of the first lenses 12, and the lens height H of the second lenses 41 is equal to the lens height H of the first lenses 12. Each of the second lenses 41 is overlapped with different one of the first lenses 12 with the plastic layer 11 located in between in a plan view toward the first lens formation surface 11a.

The second lenses 41 may be made of any material as long as the material is one of the materials that can be used for the first lenses 12. Like the first lenses 12, the second lenses 41 may be formed integrally with the plastic layer 11 or separately from the plastic layer 11.

A section of the plastic layer 11 colored by exposure to the laser beam LB and including the focal points of the first lenses 12 is an example of a first print portion. A section of the plastic layer 11 colored by exposure to the laser beam LB and including the focal points of the second lenses 41 is an example of a second print portion.

Figure 17:
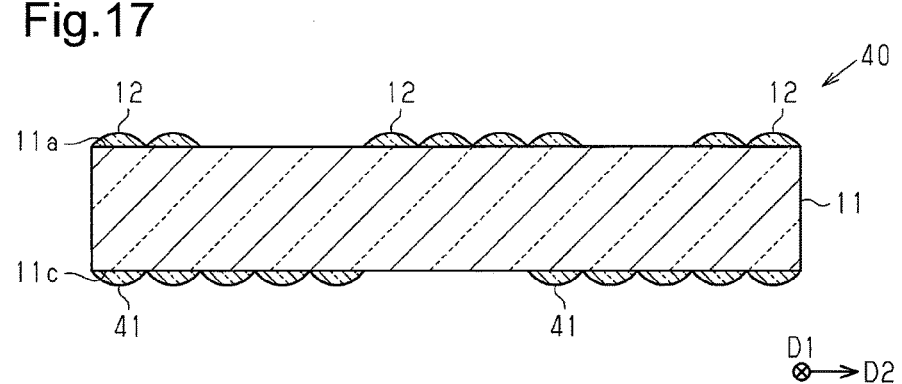
FIG. 17 is a cross-sectional view of the plastic sheet according to the second embodiment showing the configuration of the plastic sheet.

As shown in FIG. 17, the second lenses 41 may be located at one section of the second lens formation surface 11c along the second axis D2 or may be spread in some sections along the second axis D2. In this case, each of the second lenses 41 may be either overlapped with or displaced from one of the first lenses 12 with the plastic layer 11 located in between in a plan view toward the first lens formation surface 11a.

[Operation of Plastic Sheet]

Operation of the plastic sheet will now be described.

The plastic sheet 40 reduces the time during which the laser beam is projected when the color-changed portions 13 are formed in a case in which the laser beam is projected onto the plastic sheet 40 from the side facing the first lens formation surface 11a, and in a case in which the laser beam is projected onto the plastic sheet 40 from the side facing the second lens formation surface 11c. Among the color-changed portions 13 formed in the plastic layer 11, the color-changed portions 13 formed at the focal points of the first lenses 12 are an example of a first color-changed portion, and the color-changed portions 13 formed at the focal points of the second lenses 41 are an example of a second color-changed portion.

As described above, the second embodiment has the following advantages.

(9) When the color-changed portions 13 are formed at both the section close to the first lens formation surface 11a and the section close to the second lens formation surface 11c in the plastic layer 11, the time during which the laser beam is projected onto the plastic layer 11 is reduced.

Modifications of Second Embodiment

The second embodiment may be modified as follows.

Figure 18:
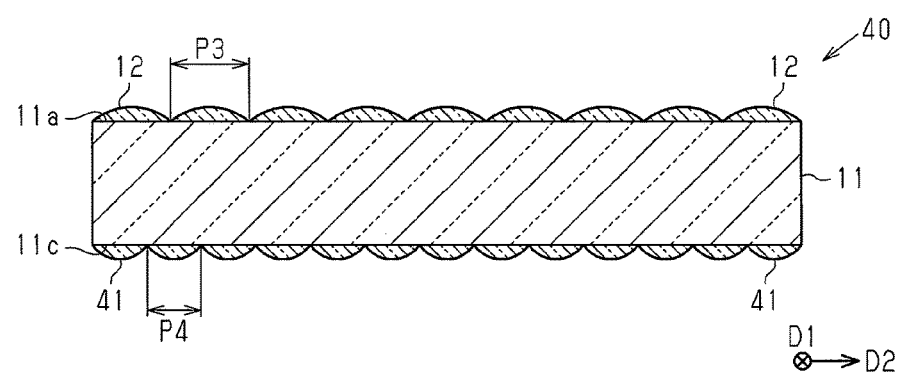
FIG. 18 is a cross-sectional view of the plastic sheet according to a modification of the second embodiment showing the configuration of the plastic sheet.

As shown in FIG. 18, a third pitch P3 of the first lenses 12 may differ from a fourth pitch P4 of the second lenses 41. In FIG. 18, for example, the third pitch P3 is greater than the fourth pitch P4. However, the third pitch P3 may be less than the fourth pitch P4. With this configuration, the following advantage is obtained.

(10) Moiré effect is prevented from occurring by the first lens group 12G formed on the first lens formation surface 11a and the second lens group 41G formed on the second lens formation surface 11c. Thus, the color-changed portions 13 formed in the plastic layer 11 are prevented from being difficult to be visually recognized due to moiré effect.

The lens height H of the first lenses 12 may differ from the lens height H of the second lenses 41.

The first lens group 12G may include the first lenses 12 having different lens heights H from one another and the first lenses 12 having different lens pitches P from one another. The second lens group 41G may include the second lenses 41 having different lens heights H from one another and the second lenses 41 having different lens pitches P from one another.

The direction in which the first lenses 12 extend may intersect with the direction in which the second lenses 41 extend. In such a configuration, for example, the plastic layer 11 includes a first layer, which includes the first lens formation surface 11a, and a second layer, which includes the second lens formation surface 11c. Alternatively, the plastic layer 11 may include one layer including the first lens formation surface 11a and the second lens formation surface 11c.

The plastic layer 11 may have any configuration as long as the first print portion, which is colored by exposure to the laser beam, is located at a section including at least the focal points of the first lenses 12. Additionally, the plastic layer 11 may have any configuration as long as the second print portion, which is colored by exposure to the laser beam, is located at a section including at least the focal points of the second lenses 41. That is, the plastic layer 11 may have any configuration as long as part of the plastic layer 11 other than the first print portion and second print portion that is closer to the first lens formation surface 11a than the first print portion has permeability for allowing the laser beam to pass through to the first print portion, and part of the plastic layer 11 other than the first print portion and second print portion that is closer to the second lens formation surface 11c than the second print portion has permeability for allowing the laser beam to pass through to the second print portion. Thus, the part closer to the first lens formation surface 11a than the first print portion and the part closer to the second lens formation surface 11c than the second print portion allow the laser beam to pass through and may be sections where the color-changed portions 13 are not formed.

The configuration of the second embodiment and the configuration of the modification of the second embodiment may be combined with the modification of the first embodiment as required.

Third Embodiment

A plastic sheet and a booklet according to a third embodiment will be described with reference to FIG. 19. The third embodiment differs from the first embodiment in the configuration of the plastic layer. The differences will mainly be discussed below, and the same reference numerals are given to those components of the third embodiment that are the same as the corresponding components of the first embodiment and detailed explanations for the same components are omitted.

[Configuration of Plastic Sheet]

The configuration of the plastic sheet will be described with reference to FIG. 19.

Figure 19:
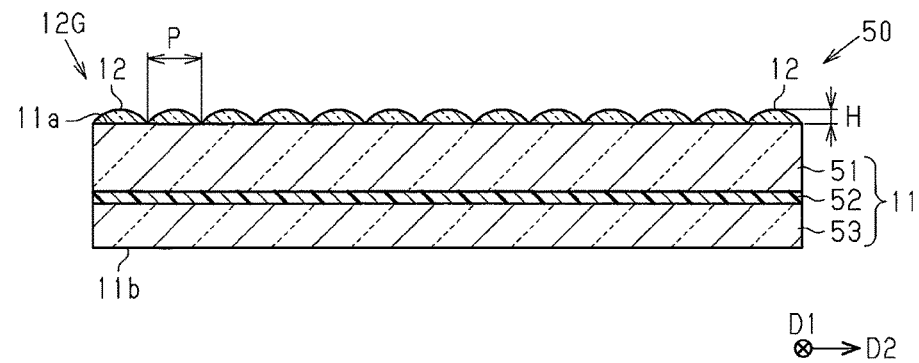
FIG. 19 is a cross-sectional view of a plastic sheet according to a third embodiment showing the configuration of the plastic sheet.

As shown in FIG. 19, a plastic sheet 50 includes the plastic layer 11 and the first lenses 12, which are located on the first lens formation surface 11a of the plastic layer 11. The plastic layer 11 includes three layers including a first print layer 51, a colored layer 52, and a transparent layer 53. Among the three layers, one of the surfaces of the first print layer 51 forms the first lens formation surface 11a, and one of the surfaces of the transparent layer 53 forms the rear surface 11b, and the colored layer 52 is located between the first print layer 51 and the transparent layer 53 in the thickness direction of the plastic layer 11. The first print layer 51 is an example of the print portion, and the colored layer 52 is an example of a colored portion.

The first lenses 12 have a shape that allows focal points to be formed in the first print layer 51 or on the surface of the first print layer 51 that contacts the colored layer 52. That is, for example, the lens pitch P and the lens height H of the first lenses 12 are set to values such that the focal points of the first lenses 12 are located in the first print layer 51 or on the surface of the first print layer 51 that contacts the colored layer 52.

The first print layer 51 may be made of any material as long as the material is one of the materials of the plastic layer 11 according to the first embodiment. That is, the first print layer 51 may be made of any material as long as the material allows the laser beam to pass through and allows the color-changed portions 13, which have a predetermined color, to be formed by projecting the laser beam on the first print layer 51. If the material of the first print layer 51 is, for example, polycarbonate, the color-changed portions 13 are black.

The colored layer 52 has a different color from the color-changed portions 13, and the colored layer 52 has, for example, a white color. The material of the colored layer 52 includes a main material, which is one of the materials for the first print layer 51, and white fine particles having a different refractive index from the main material. The main material of the colored layer 52 may be the same as or different from the material of the first print layer 51.

The white fine particles are, for example, organic particles and inorganic particles. The organic particles are composed of organic matter such as a styrenic resin, an acrylic resin, a silicone resin, a urea resin, and a formaldehyde condensate. The inorganic particles are composed of inorganic matter such as glass beads, silica, alumina, calcium carbonate, and metal oxides such as a titanium oxide. The white fine particles may also be various pigments. The white fine particles may be selected as required from the organic particles, inorganic particles, and pigments in accordance with the whiteness to be applied to the colored layer 52 or the appropriateness for a method used to form the plastic layer 11.

The transparent layer 53 may be made of any material as long as the material is one of the materials for the first print layer 51 and may be made of material that is the same as or different from the material of the first print layer 51.

The first print layer 51, the colored layer 52, and the transparent layer 53 may be formed integrally or separately. In a case in which the first print layer 51, the colored layer 52, and the transparent layer 53 are integrally formed, the material of the first print layer 51, the main material of the colored layer 52, and the material of the transparent layer 53 are preferably the same and are preferably one of the thermoplastic resins. If the material of the first print layer 51, the main material of the colored layer 52, and the material of the transparent layer 53 are the same thermoplastic resin, three layers are formed at once by melt molding such as extrusion molding and injection molding.

In a case in which the first print layer 51, the colored layer 52, and the transparent layer 53 are separately formed, a process for applying a molten material and a process for hardening the molten material are performed for each layer in the laminating order of the three layers.

In the plastic sheet 50, text or images marked on the first print layer 51 are black, and the colored layer 52, which is a layer below the first print layer 51, is white. Thus, compared with a configuration in which the plastic layer 11 includes only the first print layer 51, the color-changed portions 13 are visually recognized more easily due to the brightness difference between the color-changed portions 13 and the colored layer 52, which is the background of the color-changed portions 13.

Since the plastic layer 11 has the colored layer 52, if a damage such as a scratch is made in the plastic sheet 50 on the side of the colored layer 52 where the first print layer 51 is located or on the side of the colored layer 52 where the transparent layer 53 is located, the scratch is less evident compared with the configuration in which the plastic layer 11 has only the first print layer 51.

As described above, the third embodiment has the following advantage.

(11) Since the colored layer 52, which has a different color from the color-changed portions 13, is located closer to the rear surface 11b than the first print layer 51, the color-changed portions 13 are visually recognized more easily due to the color difference between the color-changed portions 13, which are formed in the first print layer 51, and the colored layer 52.

Modifications of Third Embodiment

The third embodiment may be modified as follows.

The colored layer 52 may have a color other than white. Any configuration in which the color of the color-changed portions 13 differ from the color of the colored layer 52 has an advantage equivalent to the above-mentioned advantage (11). If the colored layer 52 has a color other than white, the colored layer 52 may be made of any material as long as the material includes the above-mentioned main material and a pigment for applying a predetermined color to the colored layer 52.

The color-changed portions 13 may have a color other than black. Any configuration in which the color of the color-changed portions 13 differ from the color of the colored layer 52 has an advantage equivalent to the above-mentioned advantage (11). If the color of the color-changed portions 13 is other than black, the first print layer 51 may be made of any material as long as the material includes any of the above-mentioned synthetic resins and a pigment for applying a predetermined color to the color-changed portions 13.

If the colored layer 52 that has a white color is a first colored layer, the plastic layer 11 may include a second colored layer that has a different color from the first colored layer. For example, if the second colored layer is located between the transparent layer 53 and the first colored layer in the thickness direction of the plastic layer 11, the color of the plastic sheet 50 in a plan view toward the first lens formation surface 11a is visually recognized as the color of the first colored layer, and the color of the plastic sheet 50 in a plan view toward the rear surface 11b is visually recognized as the color of the second colored layer.

Figure 20:
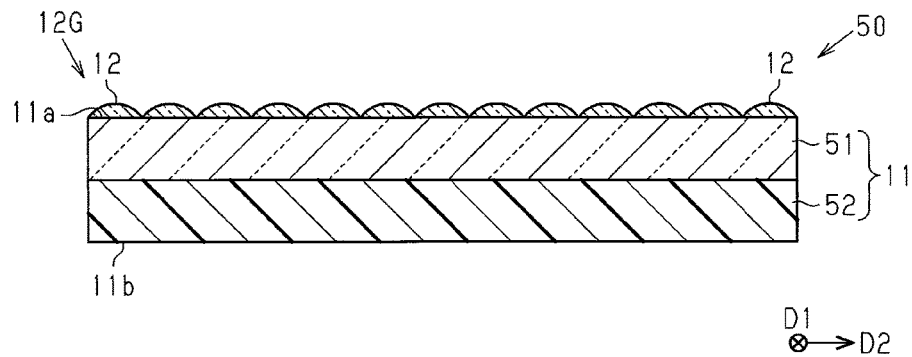
FIG. 20 is a cross-sectional view of a plastic sheet according to a modification of the third embodiment showing the configuration of the plastic sheet.

As shown in FIG. 20, the plastic layer 11 includes the first print layer 51 and the colored layer 52. One of the surfaces of the first print layer 51 may constitute the first lens formation surface 11a, and one of the surfaces of the colored layer 52 may constitute the rear surface 11b. With this configuration also, an advantage equivalent to the advantage (11) is obtained as long as the plastic layer 11 has the colored layer 52.

Figure 21:
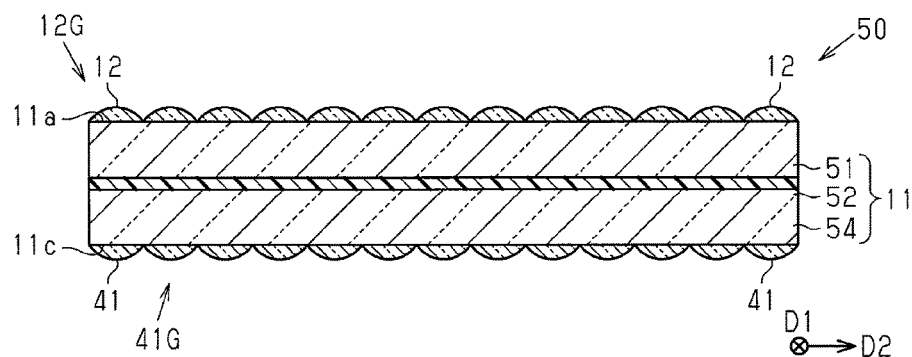
FIG. 21 is a cross-sectional view of a plastic sheet according to a modification of the third embodiment showing the configuration of the plastic sheet.

The configuration of the third embodiment may be combined with the configuration of the second embodiment. That is, as shown in FIG. 21, the plastic layer 11 includes the first print layer 51, the second print layer 54, and the colored layer 52 located between the first print layer 51 and the second print layer 54. In the plastic layer 11, one of the surfaces of the first print layer 51 forms the first lens formation surface 11a, and one of the surfaces of the second print layer 54 forms the second lens formation surface 11c. The second lenses 41 are located on the second lens formation surface 11c of the plastic layer 11. With this configuration, the color-changed portions 13 are visually recognized more easily due to the brightness difference between the color of the color-changed portions 13 formed in the first print layer 51 and the color of the colored layer 52, and the color-changed portions 13 are visually recognized more easily due to the brightness difference between the color of the color-changed portions 13 formed in the second print layer 54 and the color of the colored layer 52.

In the configuration shown in FIG. 21, if the colored layer 52 is the first colored layer, the second colored layer, which has a different color from the first colored layer, may be located between the first colored layer and the second print layer 54 in the thickness direction of the plastic layer 11. With this configuration, the color-changed portions 13 formed in the first print layer 51 are visually recognized more easily due to the color difference between the color-changed portions 13 and the first colored layer, and the color-changed portions 13 formed in the second print layer 54 are visually recognized more easily due to the color difference between the color-changed portions 13 and the second colored layer.

The colored layer 52 does not necessarily have to be overlapped with the entire first print layer 51 in a plan view toward the first lens formation surface 11a. The colored layer 52 may be located at any position as long as the colored layer 52 is located at least between the focal points of the first lenses 12 and the rear surface 11b of the plastic layer 11 in the thickness direction of the plastic layer 11. With this configuration also, as long as the plastic layer 11 has the colored portion, an advantage equivalent to the advantage (11) is obtained.

The configuration of the third embodiment may be combined with the configuration of the modification of the above-described first embodiment or the configuration of the modification of the second embodiment as required.

Fourth Embodiment

A plastic sheet and a booklet according to a fourth embodiment will be described with reference to FIG. 22. The fourth embodiment differs from the first embodiment in that the plastic sheet includes a layer covering the cylindrical lenses. The differences will mainly be discussed below, and the same reference numerals are given to those components that are the same as the corresponding components of the first embodiment and detailed explanations for the same components are omitted.

[Configuration of Plastic Sheet]

The configuration of the plastic sheet will be described with reference to FIG. 22.

Figure 22:
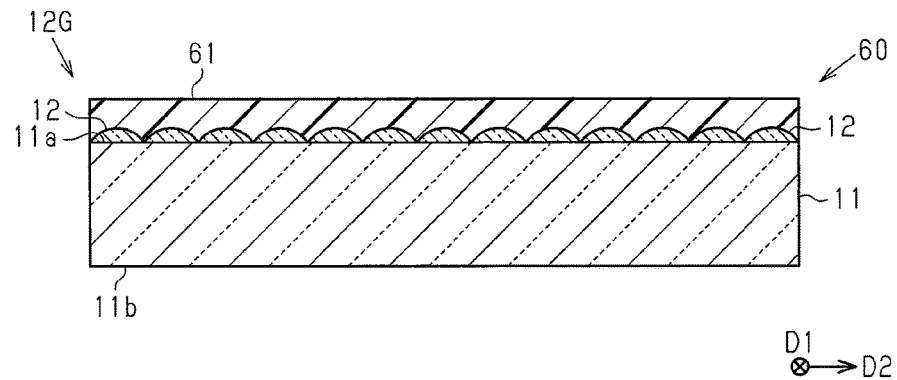
FIG. 22 is a cross-sectional view of a plastic sheet according to a fourth embodiment showing the configuration of the plastic sheet.

As shown in FIG. 22, a plastic sheet 60 includes the plastic layer 11 and the first lens group 12G. The first lens group 12G includes the first lenses 12, which are located on the first lens formation surface 11a of the plastic layer 11. The plastic sheet 60 further includes a first protective layer 61. The first protective layer 61 is located on the first lens formation surface 11a of the plastic layer 11 to cover the first lens group 12G. The first protective layer 61 increases the mechanical strength or the chemical resistance of the plastic sheet 60.

The first protective layer 61 may be provided on the first lens formation surface 11a of the plastic layer 11 by laminating the first protective layer 61 on the plastic layer 11, or may be formed on the first lens formation surface 11a of the plastic layer 11 by a thermal transfer method.

If the first protective layer 61 is laminated on the plastic layer 11, the material of the first protective layer 61 is, for example, thermoplastic resins such as a polyester resin, a polyolefin resin, a polystyrene resin, a methacrylate resin, a polycarbonate resin, a vinyl chloride resin, or a cycloolefin polymer. Alternatively, the material of the first protective layer 61 may be a compound combining two or more of the above resins. The material of the first protective layer 61 is selected as required in accordance with, for example, the level of resistance to be given to the plastic sheet 60 by the first protective layer 61.

The material for laminating the first protective layer 61 to the plastic layer 11 may be a lamination agent including a pressure-sensitive adhesive and a hardening adhesive. Any lamination agent may be used as long as the lamination agent is a resin lamination agent such as an acrylic resin and a urethane resin, and the lamination agent may be selected as required in accordance with the material of the plastic layer 11 and the material of the first protective layer 61.

An acrylic pressure-sensitive adhesive, which is one of the lamination agents, forms a pressure-sensitive adhesive layer having superior thermal resistance by cross-linking acrylic polymers as required. When the acrylic polymers are cross-linked, first, for example, functional groups that serve as cross-linking points such as carboxyl groups, hydroxyl groups, amino groups, and amide groups are added to the acrylic polymers. Subsequently, for example, a cross-linker such as an isocyanate compound, an epoxy compound, and an aziridine compound is added to the acrylic polymers to cross-link the acrylic polymers.

Among these compounds, the isocyanate compound includes, for example, aromatic isocyanates such as tolylene diisocyanate and xylene diisocyanate, alicyclic isocyanates such as isophorone diisocyanate, and aliphatic isocyanates such as hexamethylene diisocyanate.

One of the surfaces of the first protective layer 61 that faces the lamination agent, which is the rear surface, may be subjected to a process for increasing adhesion to the lamination agent. One of the surfaces of the first protective layer 61, which is the top surface, on the opposite side to the surface facing the lamination agent may be subjected to a predetermined process including a process for forming information such as images and text and a process for providing a hard coating depending on the function to be applied to the first protective layer 61. Alternatively, the rear surface of the first protective layer 61 may be subjected to the above-mentioned predetermined process performed on the top surface. If the first protective layer 61 has information, the plastic sheet 10 is given information other than, for example, text and images formed of the color-changed portions 13.

If the first protective layer 61 is formed by thermal transfer, the material of the first protective layer 61 is, for example, a thermoplastic resin, a thermosetting resin, a mixture of the thermoplastic resin and the thermosetting resin, and a thermoformable material including radically polymerizable unsaturated group. The thermoplastic resin includes a urethane resin, a polycarbonate resin, a polystyrene resin, and a polyvinyl chloride resin. The thermosetting resin may be an unsaturated polyester resin, a melamine resin, an epoxy resin, urethane(meta)acrylate, polyester (meta)acrylate, epoxy(meta)acrylate, polyol(meta)acrylate, melamine(meta)acrylate, and triazine(meta)acrylate.

If the first protective layer 61 is formed by thermal transfer, the first lens formation surface 11a of the plastic layer 11 and the outer surfaces of the first lenses 12 may be subjected to a treatment for increasing adhesion to the first protective layer 61. The treatment for increasing the adhesion includes, for example, a corona treatment and a treatment for forming an anchor layer. The material of the anchor layer includes, for example, polyester polyol, polyetherpolyol, polycarbonate polyol, acrylic polyol, and polyurethane. A curing agent of the anchor layer includes, for example, isocyanate. The corona treatment and the treatment for forming the anchor layer may be combined.

Like the first protective layer 61 laminated on the plastic layer 11 with the lamination agent, the first protective layer 61 formed by the thermal transfer may have information including predetermined text and images.

The first protective layer 61 is formed on the first lens formation surface 11a of the plastic layer 11 after text or images are marked in the plastic layer 11 by projecting the laser beam onto the plastic sheet 60. Thus, after the first protective layer 61 is formed on the plastic sheet 60, it is difficult to mark text or images in the plastic layer 11 by using the first lenses 12 since the first lens group 12G is covered with the first protective layer 61. This configuration prevents text and images from being rewritten in the plastic layer 11, and consequently prevents falsification of the plastic sheet 60 by rewriting, that is, falsification of the information on the plastic sheet 60.

As described above, the fourth embodiment has the following advantage.

(12) The first protective layer 61 increases the mechanical strength and the chemical resistance of the plastic sheet.

Modifications of Fourth Embodiment

The fourth embodiment may be modified as follows.

As shown in FIGS. 3 and 4, if the first lens formation surface 11a of the plastic layer 11 has sections where the first lenses 12 are not formed, the first protective layer 61 may be formed on only the sections of the first lens formation surface 11a where the first lenses 12 are not formed.

In addition to the first protective layer 61, which covers the first lens group 12G, the plastic layer 11 may include a protective layer that covers the rear surface 11b of the plastic layer 11.

Figure 23:
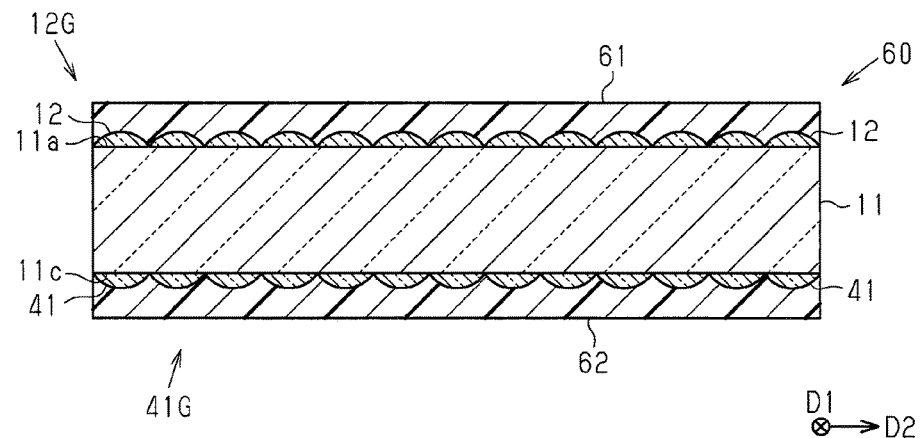
FIG. 23 is a cross-sectional view of a plastic sheet according to a modification of the fourth embodiment showing the configuration of the plastic sheet.

The configuration of the fourth embodiment may be combined with the configuration of the second embodiment. That is, as shown in FIG. 23, the plastic sheet 60 may include the second lens group 41G, which is located on the second lens formation surface 11c of the plastic layer 11, and a second protective layer 62. The second protective layer 62 covers the second lens group 41G. With this configuration, the second lens formation surface 11c of the plastic layer 11 also has increased mechanical strength and increased chemical resistance by the second protective layer 62. Since the second lens group 41G is covered with the second protective layer 62, it is difficult to mark text or images on the plastic layer 11 by using the second lenses 41. This configuration prevents text or images from being rewritten in the plastic layer 11, and consequently prevents falsification of the plastic sheet 60 by rewriting, that is, falsification of the information on the plastic sheet 60.

The configuration of the fourth embodiment may be combined with the configuration of the second embodiment shown in FIG. 17. That is, the first lens formation surface 11a of the plastic layer 11 may have sections on which the first lenses 12 are not formed, and the second lens formation surface 11c of the plastic layer 11 may have sections on which the second lens 41 are not formed. With this configuration, the protective layer may be formed on at least one of the first lens formation surface 11a and the second lens formation surface 11c at only the sections of the lens formation surface where the lenses are not formed.

Figure 24:
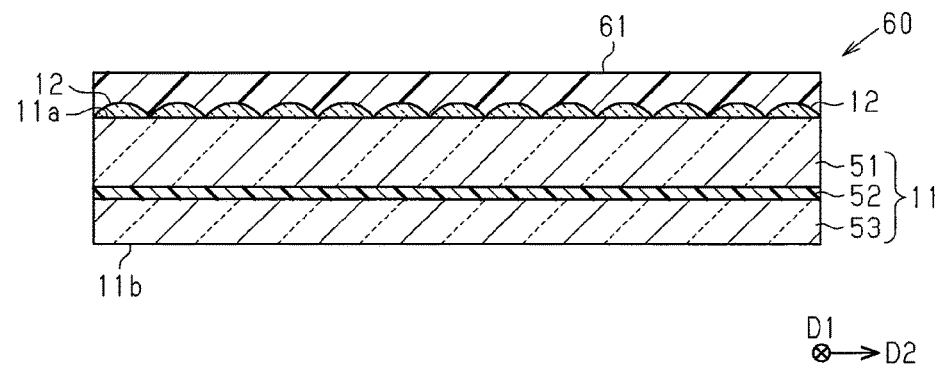
FIG. 24 is a cross-sectional view of a plastic sheet according to a modification of the fourth embodiment showing the configuration of the plastic sheet.

The configuration of the fourth embodiment may be combined with the configuration of the third embodiment. That is, as shown in FIG. 24, the plastic layer 11 of the plastic sheet 60 may include the first print layer 51, the colored layer 52, and the transparent layer 53. The colored layer 52 may be located between the first print layer 51 and the transparent layer 53 in the thickness direction of the plastic layer 11.

Figure 25:
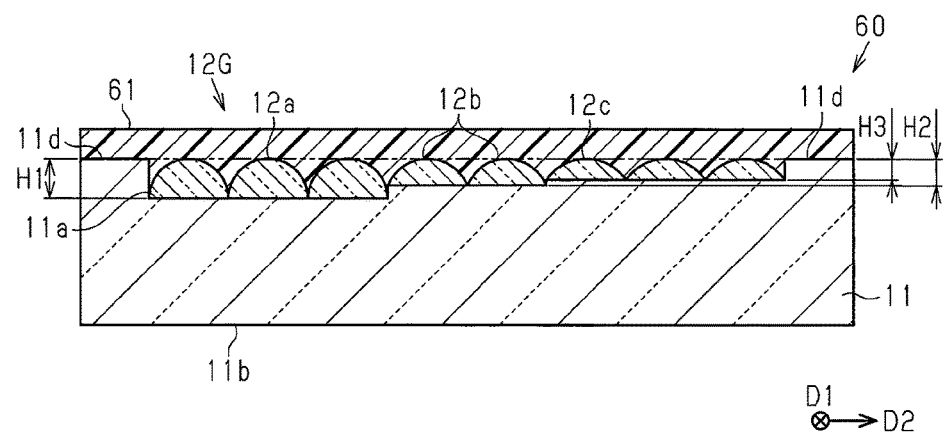
FIG. 25 is a cross-sectional view of a plastic sheet according to a modification of the fourth embodiment showing the configuration of the plastic sheet.

As shown in FIG. 25, the first lens group 12G of the plastic sheet 60 may include the above-mentioned largest lenses 12a, the medium lenses 12b, and the smallest lenses 12c. With this configuration, the first lens formation surface 11a of the plastic layer 11 may have steps that cancel the difference between the vertexes of the first lenses 12, which have different lens heights H from one another, in the thickness direction of the plastic layer 11. That is, the first lens formation surface 11a may include steps that allow the vertexes of all the first lenses 12 included in the first lens group 12G to be leveled.

With this configuration, the first lens formation surface 11a of the plastic layer 11 may have non-formation areas 11d on which the first lenses 12 are not formed. The non-formation areas 11d are located on two ends of the first lens formation surface 11a in the direction of the second axis D2. The position of the non-formation areas 11d in the thickness direction of the plastic layer 11 is preferably the same as the position of the vertexes of the first lenses 12. That is, in the thickness direction of the plastic layer 11, the sum of the width of the part of the plastic layer 11 other than the non-formation area 11d and the width of each first lens 12 is preferably equal to the width of the parts of the plastic layer 11 where the non-formation areas 11d are formed.

This configuration prevents a step from being formed on the top surface of the first protective layer 61, that is, the surface on the opposite side to the surface of the first protective layer 61 that contacts the first lens group 12G since the vertexes of the first lenses 12 are aligned with the non-formation areas 11d in the thickness direction of the plastic layer 11.

The first protective layer 61 may be omitted from the plastic sheet 60 shown in FIG. 25, that is, from the configuration in which the vertexes of the first lenses 12 are aligned with the non-formation areas 11d in the thickness direction of the plastic layer 11. With this configuration, scratches formed on the plastic sheet 60 are unlikely to be concentrated on the first lenses 12 compared with a configuration in which the vertexes of the first lenses 12 project, in terms of height, from the non-formation areas 11d in a direction apart from the rear surface 11b. Specifically, scratches are unlikely to be formed on the outer surfaces of the first lenses 12 that are adjacent to the non-formation areas 11d in the direction of the second axis D2.

The configuration of the fourth embodiment may be combined with the configuration of the modification of the first embodiment, the modification of the second embodiment, and the modification of the third embodiment as required.

Fifth Embodiment

A plastic sheet and a booklet according to a fifth embodiment will be described with reference to FIGS. 26 to 28. The fifth embodiment differs from the first embodiment in the configuration of the plastic layer. The differences will mainly be discussed below, and the same reference numerals are given to those components of the fifth embodiment that are the same as the corresponding components of the first embodiment and detailed explanations for the same components are omitted.

[Configuration of Plastic Sheet]

The configuration of a plastic sheet 70 will be described with reference to FIG. 26.

Figure 26:
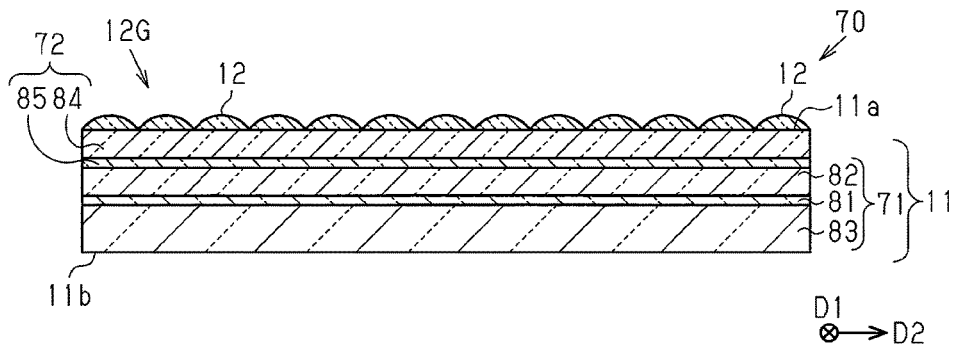
FIG. 26 is a cross-sectional view of a plastic sheet according to a fifth embodiment showing the configuration of the plastic sheet.

As shown in FIG. 26, the plastic sheet 70 includes the plastic layer 11 and the first lenses 12, which are located on the first lens formation surface 11a of the plastic layer 11. The plastic layer 11 includes a color-changeable laminate 71 and a releasable laminate 72. The surface of the color-changeable laminate 71 on the opposite side to the surface that contacts the releasable laminate 72 is the rear surface 116b of the plastic layer 11. The surface of the releasable laminate 72 on the opposite side to the surface that contacts the color-changeable laminate 71 is the first lens formation surface 11a of the plastic layer 11.

The color-changeable laminate 71 includes the print layer 81, which is an example of the print portion, the first coating layer 82, and the second coating layer 83. The print layer 81 is located between the first coating layer 82 and the second coating layer 83 in the thickness direction of the plastic layer 11. The surface of the second coating layer 83 on the opposite side to the surface that contacts the print layer 81 is the rear surface 11b of the plastic layer 11.

Among the three layers of the color-changeable laminate 71, the first coating layer 82 is permeable to a laser beam and allows the laser beam that is projected onto the plastic layer 11 to pass through to the print layer 81. The print layer 81 may be made of any material as long as the material allows the laser beam to pass through and allows a color-changed portion having a predetermined color to be formed by exposure of the print layer 81 to the laser beam.

The releasable laminate 72 includes a support layer 84 and a releasable layer 85. The support layer 84 supports the first lenses 12. The surface of the support layer 84 on the opposite side to the surface that contacts the releasable layer 85 is the first lens formation surface 11a.

The support layer 84 and the releasable layer 85 are permeable to the laser beam and allow the laser beam projected onto the plastic layer 11 to pass through to the print layer 81.

The adhesion of the releasable layer 85 to the support layer 84 is superior to the adhesion of the releasable layer 85 to the first coating layer 82. The adhesion between the layers of the color-changeable laminate 71 is superior to the adhesion of the releasable layer 85 to the first coating layer 82. Force required to cause an interfacial fracture between the first coating layer 82 and the releasable layer 85 is less than force required to cause cohesive fracture in the layers of the plastic layer 11.

Thus, if a force that divides the plastic layer 11 in the thickness direction of the plastic layer 11 is applied to the plastic layer 11, the releasable layer 85 peels off from the first coating layer 82.

The material of the releasable layer 85 includes, for example, an acrylic pressure-sensitive adhesive that is permeable to the laser beam and a silicone pressure-sensitive adhesive. To enhance the adhesion of the releasable layer 85 to the support layer 84, an easy adhesion layer formed of urethane material may be provided between the support layer 84 and the releasable layer 85.

The first lenses 12 have a shape that forms a focal point either on a surface of the print layer 81 that contacts the first coating layer 82, on a surface that contacts the second coating layer 83, or in the print layer 81. That is, for example, the lens pitch P and the lens height H of the first lenses 12 are set to values such that the focal points of the first lenses 12 are located at any of the above-mentioned sections.

[Operation of Plastic Sheet]

Operation of the plastic sheet 70 will be described with reference to FIGS. 27 and 28.

Figure 27:
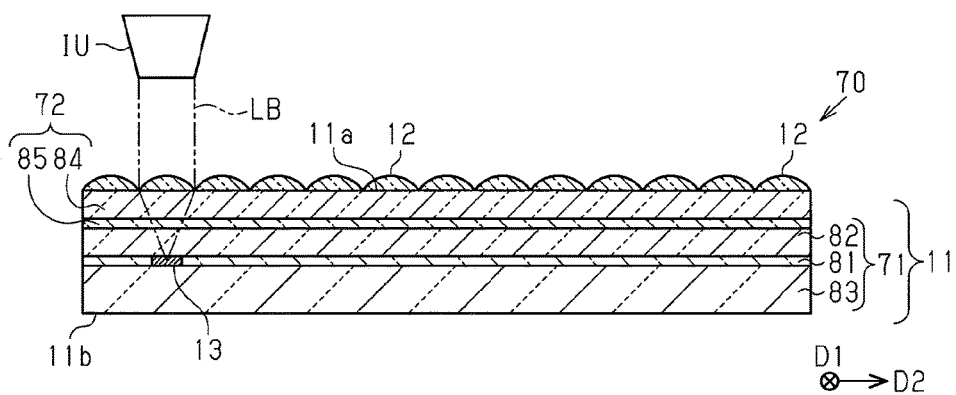
FIG. 27 is an operation diagram for explaining operation of the fifth embodiment.

As shown in FIG. 27, the projection unit IU projects the laser beam LB toward one of the first lenses 12 on the plastic sheet 70. The laser beam LB converges to a part of the print layer 81, forming the color-changed portion 13 at the part of the print layer 81.

Figure 28:
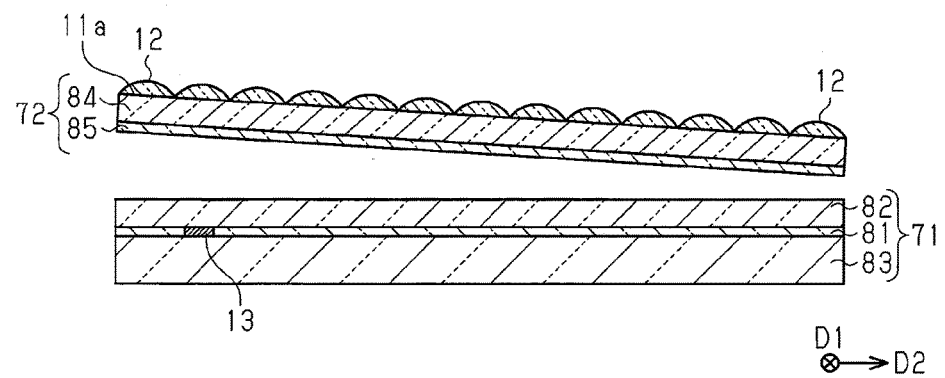
FIG. 28 is an operation diagram for explaining operation of the fifth embodiment.

As shown in FIG. 28, if force that divides the plastic sheet 70 in the thickness direction acts on the plastic sheet 70 after exposure to the laser beam LB, the releasable layer 85 peels off the first coating layer 82. That is, the releasable laminate 72, which includes the first lenses 12, separate from the color-changeable laminate 71, which includes the color-changed portion 13.

According to the plastic sheet 70, the first lenses 12 can be separated from the color-changeable laminate 71, which includes the print layer 81, after the color-changed portions 13 are formed. Thus, compared with the configuration that includes the first lenses 12 even after the color-changed portions 13 are formed, the laser beam LB is hindered from converging to the print layer 81 since the color-changeable laminate 71 does not include the first lenses 12. This prevents additional color-changed portions from being formed on the print layer 81, that is, text and images are prevented from being rewritten on the print layer 81. As a result, the information of the color-changeable laminate 71 is prevented from being falsified by rewriting on the print layer 81.

As described above, the fifth embodiment has the following advantage.

(13) Since the plastic sheet 70 includes the releasable layer 85, the color-changeable laminate 71 in which the color-changed portions 13 have been formed can be separated from the first lenses 12. This prevents the print layer 81 of the color-changeable laminate 71 from being rewritten, and consequently prevents the information on the color-changeable laminate 71 from being falsified.

Modifications of Fifth Embodiment

The fifth embodiment may be modified as follows.

Figure 29:
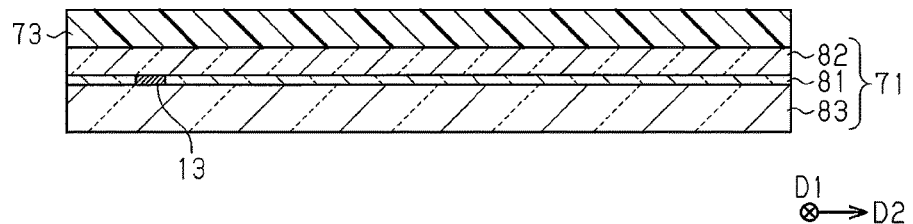
FIG. 29 is a cross-sectional view of the plastic sheet according to a modification of the fifth embodiment showing the configuration of the plastic sheet.

As shown in FIG. 29, after the releasable laminate 72, which includes the first lenses 12, is separated from the color-changeable laminate 71, a coating layer 73 may be formed or laminated on the color-changeable laminate 71 to cover the first coating layer 82 of the color-changeable laminate 71.

In this case, the coating layer 73 preferably includes a hologram such as a relief hologram and a volume hologram. If the coating layer 73 is configured to include a hologram, the color-changeable laminate 71 can be judged to be genuine or not by determining whether the color-changeable laminate 71 has a hologram. If the coating layer 73 is configured to include a hologram, the color-changeable laminate 71 can be decorated with the hologram, improving the design of the color-changeable laminate 71.

The coating layer 73 may be formed on the opposite side of the second coating layer 83 from the print layer 81.

Figure 30:
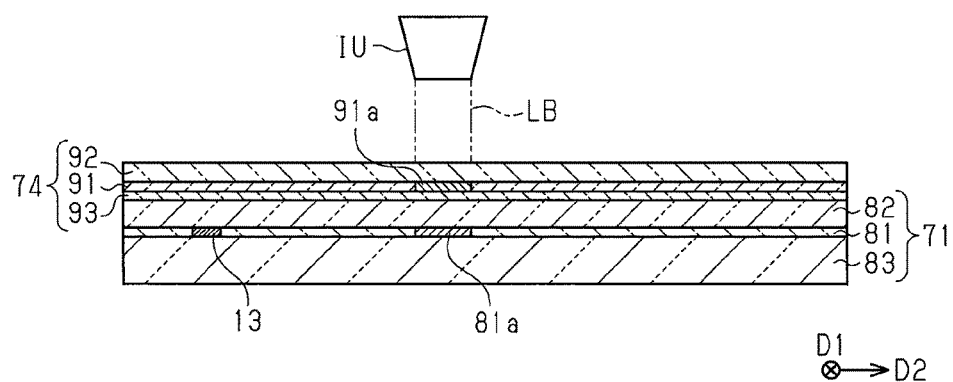
FIG. 30 is a cross-sectional view of the plastic sheet according to a modification of the fifth embodiment showing the configuration of the plastic sheet.

As shown in FIG. 30, after the releasable laminate 72, which includes the first lenses 12, is separated from the color-changeable laminate 71, a coating laminate 74 may be formed or laminated on the color-changeable laminate 71. The coating laminate 74 covers the first coating layer 82 of the color-changeable laminate 71.

The coating laminate 74 includes a print layer 91, a first coating layer 92, and a second coating layer 93. The print layer 91 is located between the first coating layer 92 and the second coating layer 93. The second coating layer 93 of the coating laminate 74 is the layer that contacts the color-changeable laminate 71.

The first coating layer 92 is permeable to the laser beam and allows the laser beam projected onto the coating laminate 74 to pass through to the print layer 91. The print layer 91 may be made of any material as long as the material allows the laser beam to pass through and allows color-changed portions having a predetermined color to be formed by exposure of the print layer 91 to the laser beam.

The coating laminate 74 is permeable to the laser beam and allows the laser beam projected onto the coating laminate 74 to reach the print layer 81 of the color-changeable laminate 71.

The print layer 91 of the coating laminate 74 is preferably configured to allow color-changed portions to be formed with energy less than that required for the print layer 81 of the color-changeable laminate 71. With this configuration, even if the laser beam is projected onto the color-changeable laminate 71 in a state in which the focal point of the laser beam is set to the print layer 81 of the color-changeable laminate 71, color-changed portions are formed in the print layer 91 that has allowed the laser beam projected toward the color-changeable laminate 71 to pass through.

Thus, when the projection unit IU projects the laser beam LB with the focal point of the laser beam LB set to the print layer 81 of the color-changeable laminate 71, a new color-changed portion 81a is formed on the print layer 81. Simultaneously, a color-changed portion 91a is also formed at part of the print layer 91 of the coating laminate 74. The color-changed portion 91a is overlapped on the color-changed portion 81a formed in the print layer 81 in the thickness direction of the coating laminate 74.

Thus, among the color-changed portions in the print layer 81, the color-changed portion 81a that is formed after the color-changeable laminate 71 is separated from the releasable laminate 72 can be identified by the existence of the color-changed portion 91a. As a result, falsification of the information on the print layer 81 is easily detected.

Figure 31:
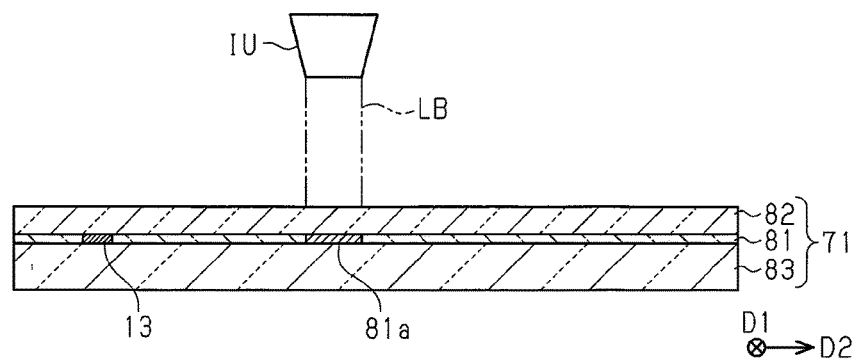
FIG. 31 is a cross-sectional view of the plastic sheet according to a modification of the fifth embodiment showing the configuration of the plastic sheet.

In contrast, with the configuration in which the color-changeable laminate 71 is not covered with the coating laminate 74 as shown in FIG. 31, if the color-changed portion 81a is formed on the print layer 81, the color-changed portion 81a is hard to be distinguished from the color-changed portion 13 that is formed by using the first lenses 12. It is therefore difficult to detect that the information on the print layer 81 has been falsified.

The color-changeable laminate 71 does not necessarily have to include at least one of the first coating layer 82 and the second coating layer 83. That is, the color-changeable laminate 71 may have any configuration as long as the color-changeable laminate 71 includes at least the print layer 81. With this configuration also, an advantage equivalent to the above-mentioned advantage (13) is obtained.

The coating laminate 74 does not necessarily have to include at least one of the first coating layer 92 and the second coating layer 93. That is, the coating laminate 74 may have any configuration as long as the coating laminate 74 includes at least the print layer 91. Such a configuration also allows text or images to be marked on the coating laminate 74 and has an advantage that is equivalent to the advantage of the coating laminate 74 having three layers as described above.

The configuration of the fifth embodiment may be combined with the configuration of the third embodiment. In this case, any configuration may be employed as long as the colored layer is located between the print layer 81 and the second coating layer 83 of the color-changeable laminate 71.

The configuration of the fifth embodiment may be combined with the configuration of the second embodiment or the configuration of the modification of the second embodiment. In this case, one color-changeable laminate 71 is preferably located between two releasable laminates 72 in the thickness direction of the plastic layer 11. One of the releasable laminates 72 includes the first lenses 12, and the other releasable laminate 72 includes the second lenses 41.

Configuration of the fifth embodiment may be combined with the configuration of the modification of the first embodiment as required.

DESCRIPTION OF THE REFERENCE NUMERALS 10, 40, 50, 60, 70 . . . plastic sheet, 11 . . . plastic layer, 11a . . . first lens formation surface, 11b . . . rear surface, 11c . . . second lens formation surface, 11d . . . non-formation area, 12, 12f . . . first lens, 12a . . . largest lens, 12b . . . medium lens, 2c . . . smallest lens, 12d . . . narrow lens, 12e . . . wide lens, 12g . . . first lens group, 13 . . . color-changed portion, 20 . . . booklet, 21 . . . booklet pages, 22 . . . fold, 23 . . . information, 30 . . . card, 31 . . . base material, 32 . . . reading direction, 41 . . . second lens, 41G . . . second lens group, 51 . . . first print layer, 52 . . . colored layer, 53 . . . transparent layer, 54 . . . second print layer, 61 . . . first protective layer, 62 . . . second protective layer, 71 . . . color-changeable laminate, 72 . . . releasable laminate, 73 . . . coating layer, 74 . . . coating laminate, 81, 91 . . . print layer, 82, 92 . . . first coating layer, 83, 93 . . . second coating layer, 84 . . . support layer, 85 . . . releasable layer, IU . . . projection unit, LB . . . laser beam.

The invention claimed is:

1. A plastic sheet comprising:
a plastic layer including a first surface and a second surface on an opposite side of the plastic layer from the first surface; and
at least one cylindrical lens formed on the first surface and extending along a first axis, wherein
the plastic layer includes a print portion that is to be colored by exposure to a laser beam,
the at least one cylindrical lens comprises a plurality of first lenses,
the first lenses are located on the first surface,
the plastic sheet further includes second lenses that are cylindrical lenses, on the second surface,
the first lenses
extend along the first axis,
are arranged side by side along a second axis that intersects the first axis, and
have widths equal to one another along the second axis,
the second lenses
extend along the first axis,
are arranged side by side along the second axis, and
have widths equal to one another along the second axis, the print portion is a first print portion, the first print portion includes focal points of the first lenses, the plastic layer is configured to allow a laser beam that enters the first lenses to pass through the first print portion, the plastic layer further includes a second print portion that is to be colored by exposure to a laser beam, the second print portion includes focal points of the second lenses, the plastic layer is configured to allow the laser beam that enters the second lenses to pass through to the second print portion, and the width along the second axis of the first lenses differs from the width along the second axis of the second lenses.

2. The plastic sheet according to claim 1, wherein the plastic layer further includes, in at least part of the plastic layer between the first print portion and the second surface in a thickness direction of the plastic layer, a colored portion that has a color different from a color-changed portion that has been colored by exposure to the laser beam.

3. The plastic sheet according to claim 1, wherein the plurality of first lenses have different heights from one another.

4. The plastic sheet according to claim 1, wherein the plastic layer includes, in the first print portion, a color-changed portion that has been colored by exposure to the laser beam.

5. The plastic sheet according to claim 1, wherein the plastic layer is made of a material that is the same as the material of the plurality of first lenses, and the plastic layer and the plurality of first lenses are made of any material selected from a group consisting of a polycarbonate resin, a styrene acrylonitrile copolymer resin, and a cycloolefin polymer.

6. The plastic sheet according to claim 1, wherein the material of each of the first lenses is a plastic, each of the first lenses has a lens pitch P that is a width along a second axis that intersects the first axis, each of the first lenses has a height that is a lens height H, the lens pitch P and the lens height H satisfy a relationship represented by $H/P \leq 0.7$.

7. A booklet comprising:

at least one booklet page formed of a plastic sheet; and a fold where the booklet page is folded in a middle, wherein the plastic sheet is the plastic sheet according to claim 1, and the first axis is parallel to a direction in which the fold extends.

8. A booklet comprising:

at least one booklet page formed of a plastic sheet; and a fold where the booklet page is folded in a middle, wherein the plastic sheet is the plastic sheet according to claim 1, and the first axis intersects a direction in which the fold extends.

\* \* \* \* \*